(12) United States Patent
Asai et al.

(10) Patent No.: US 6,421,606 B1
(45) Date of Patent: Jul. 16, 2002

(54) ROUTE GUIDING APPARATUS AND MEDIUM

(75) Inventors: Goro Asai; Fusaki Igarashi; Kenichi Murata; Takahiro Hashimoto, all of Susono; Masaki Kakihara, Yokohama, all of (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 09/637,928

(22) Filed: Aug. 14, 2000

(30) Foreign Application Priority Data

| Aug. 17, 1999 | (JP) | 11-230864 |
| Oct. 8, 1999 | (JP) | 11-287555 |
| Oct. 13, 1999 | (JP) | 11-291175 |
| Nov. 18, 1999 | (JP) | 11-328762 |
| Dec. 13, 1999 | (JP) | 11-353083 |
| Jul. 21, 2000 | (JP) | 2000-220245 |

(51) Int. Cl.[7] .............................................. G06F 7/00
(52) U.S. Cl. ..................................... 701/209; 701/210
(58) Field of Search .............................. 701/200, 201, 701/206, 208, 209, 204, 207, 300, 302

(56) References Cited

U.S. PATENT DOCUMENTS

| 5,893,081 A | | 4/1999 | Poppen | |
| 6,101,443 A | * | 8/2000 | Kato et al. | 701/210 |
| 6,119,065 A | * | 9/2000 | Shimada et al. | 701/201 |

FOREIGN PATENT DOCUMENTS

| DE | 196 36 379 | 3/1998 |
| EP | 0 638 887 | 2/1995 |
| JP | 7-55484 | 3/1995 |
| JP | 7-104848 | 4/1995 |
| JP | 9-44754 | 2/1997 |
| JP | 9-115086 | 5/1997 |
| JP | 10-78981 | 3/1998 |
| JP | 10-103999 | 4/1998 |
| JP | 10-170288 | 6/1998 |
| JP | 10-318777 | 12/1998 |

* cited by examiner

Primary Examiner—William A. Cuchlinski, Jr.
Assistant Examiner—Edward Pipala
(74) Attorney, Agent, or Firm—Finnegan, Henderson, Farabow, Garrett & Dunner, L.L.P.

(57) ABSTRACT

A route guiding apparatus provides information for a route using public transportation as an alternative to a vehicular route. In addition to searching for a vehicular route from a current location to a destination, it is determined whether the current location and the destination are within a zone in which public transportation can be used. When the current location and the destination are determined to be within a public transportation zone, a route using public transportation is searched for. Subsequently, the cost of the route using public transportation and the cost of the vehicular route are compared. When the cost of the public transportation route falls within a predetermined limit, the apparatus indicates the public transportation route. The route costs are calculated considering factors such as required travel time and ticket fees. The apparatus may also recommend public transportation when no parking is available near the destination, or based on traffic information concerning the vehicular route.

38 Claims, 14 Drawing Sheets

ROUTE GUIDING APPARATUS AND MEDIUM

BACKGROUND OF THE INVENTION

1. Field of the Invention

The present invention relates to a route guiding apparatus, and particularly to a device employing a route search using public transportation routes in addition to vehicular routes.

2. Description of the Background Art

A navigation apparatus including map data, which searches for a route to a destination and presents the route to a user, is conventionally known. A significant technical object of such a navigation apparatus is to provide the user with a route that allows the user to reach a target destination in a short time.

One guiding technique is disclosed in Japanese Patent Laid-Open Publication No. Hei 7-55484. According to this technique, a user designates a destination, and then inputs a target arrival time. The apparatus computes an estimated arrival time at the destination taking into account information such as traffic condition information, and compares the target arrival time and the estimated arrival time. When the estimated arrival time is later than the target arrival time, information on an alternative transportation, such as rail lines, is provided to the user. Specifically, the apparatus informs the user that "As is, it is impossible to reach by the target arrival time", and displays the rail option, the telephone number of the destination facility, and other such information. When the user selects the rail option, the time required to travel from the current location to a nearby station, and from a station near the destination to the destination, is calculated. Information such as the name of the transportation service, the departure station, the arrival station, and the transfer station are also offered.

According to the above technique, a route using alternative transportation, specifically, public transportation, is searched for when the estimated arrival time is later than the target arrival time. Such a method is disadvantageous in that the efficacy of the use of public transportation is not necessarily ensured. In the above conventional technique, it is further described that a ratio between the travel time required by driving a vehicle and the travel time required by public transportation is compared to a predetermined value, and, when the ratio is less than the predetermined value, guiding information concerning public transportation is not offered. However, it is difficult to determine which traveling means is more appropriate based only on the required travel time because other factors are concerned. For example, ticket fees are additionally necessary when using railway.

SUMMARY OF THE INVENTION

An object of the present invention is to provide an apparatus which offers a route using public transportation when the advantage of using public transportation is ensured, thereby achieving enhanced user convenience and increased reliability of navigation systems.

Another object of the present invention is to conduct a search for a route using public transportation by employing the same search algorithm used for vehicular route searches, and to thereby provide an apparatus having a simplified configuration.

A further object of the present invention is to provide an apparatus which can precisely indicate the current location to the user when offering a route involving public transportation.

A still further object of the present invention is to provide an apparatus which can safely guide the user when offering a route using public transportation.

To accomplish the above objects, a route guiding apparatus of the present invention comprises a calculation means for calculating a cost associated with a route using public transportation (also referred to as a public transportation route) and a cost associated with a vehicle only route (also referred to as a vehicular route), and a control means for indicating the route using public transportation when the cost of the route using public transportation is less than vehicle only route adjusted by a predetermined factor. The route using public transportation (public transportation route) is a route including, in at least one portion of the route, a service route of a public transportation service such as railway, subway, bus, ferry, and airplane, and may also include traveling on foot. The vehicle only route (vehicular route) is a route including no public transportation service route, and which therefore may be traveled by motor vehicle only. By comparing the public transportation route and the vehicular route using the associated costs, and indicating the public transportation route when the economy of the public transportation route exceeds a predetermined value, the public transportation route is offered when there actually exists a merit in its use. A cost of a route referred to herein comprises not only monetary costs, but includes weighted factors related to distance, time, and fees, which must be incurred when traveling from the current location to the destination. When a route involves greater distance, time, or fees, the cost of the route is increased. By reflecting the loads related to distance, time, and fees in the cost, a comprehensive comparison of a public transportation route and a route using vehicle only can be accomplished. The financial factor can be eliminated from the cost calculation when financial expenses are not relevant to the user.

In one aspect of the present invention, the distance load is converted into a time load, and the cost of the public transportation route and the cost of the vehicular route are compared in units of time. In conventional techniques, a vehicular route cost is calculated in units of distance based on the link cost (sum of the cost allotted to each link when the road data is configured using links and nodes) or node cost (sum of the cost allotted to each node when the road data is configured using links and nodes) designated according to distance and road type, and the route having the smallest cost is determined as the optimal route (when traffic is congested, the cost factor of the congested link is increased). However, as a public transportation service generally operates according to a predetermined service schedule or timetable, it is more appropriate to evaluate a public transportation route in units of time rather than in units of distance of the service route. Accordingly, a vehicular route is also calculated in units of time rather than distance, to facilitate judging which of the public transportation route or the vehicular route is more appropriate. To calculate the cost of the vehicular route in units of time in the present invention, the distance cost used in conventional route search techniques is divided by the vehicle velocity. The vehicle velocity is preferably a value in accordance with the road type, and may be the legal speed limit on the road or a statistically calculated average velocity.

According to another aspect of the present invention, the calculation means calculates, for the vehicular route, the estimated arrival time via a static route and the estimated arrival time via a dynamic route. When the estimated arrival time via the dynamic route exceeds the estimated arrival time via the static route by a predetermined time interval, the control means indicates the public transportation route. Vehicular routes may be classified into one of two types, a static route obtained based on the connection relationship in map data without considering the current traffic condition, or a dynamic route generated based on the connection relationship in map data while also considering traffic information that continually changes over time. When the estimated arrival time from the current location to the destination via the dynamic route exceeds the estimated arrival time from the current location to the destination via the static route by a predetermined interval, the road most likely cannot be smoothly traveled due to traffic congestion or other reasons. Accordingly, in such a case, the public transportation route is indicated. In this way, the public transportation route can be offered to the user when there exists additional merit in its use. The dynamic route can be indicated as the recommended route when the cost of the dynamic route is smaller than the cost of the public transportation route.

In a further aspect of the present invention, the route guiding apparatus further comprises a memory means for storing in advance a zone in which public transportation can be used, and the control means offers a route using public transportation when the current location and/or the destination is located within the zone in which public transportation can be used.

In a still further aspect of the present invention, a public transportation route is offered when there exists a plurality of public transportation services that can be used. When there is only one usable public transportation service to reach the destination, the certainty of arriving at the destination is determined to be lower than a case when a plurality of such public transportation services exist. Accordingly, the user can be reliably guided to the destination by indicating a public transportation route when there exists a plurality of public transportation services that can be used.

In another aspect of the present invention, the route guiding apparatus includes a detachable portable terminal device. The portable terminal device stores the guiding information for a public transportation route. The device guides the user to the destination based on the stored route guiding information when the user detaches and carries the portable terminal device to use public transportation.

In a further aspect of the present invention, the portable terminal device is prohibited from being detached during vehicle traveling. In addition, when the user dismounts from the vehicle, the route guiding apparatus urges the user to detach and carry the portable terminal device.

According to a still further aspect of the present invention, for the purpose of conducting an efficient search for a public transportation route, the route guiding apparatus comprises a memory means for storing map data related to public transportation routes as link information and node information, and the calculation means calculates the cost of a public transportation route based on such link information and node information. The public transportation service routes are configured using links and nodes which are similar to the links and nodes constituting the vehicular routes, allowing the road data and the public transportation data to be treated seamlessly. With this arrangement, a public transportation route can be searched for by employing the same search algorithm used for vehicular route searches.

According to another aspect of the present invention, when configuring a service route of a public transportation service using links and nodes, the node information includes a node denoting the location of a parking lot near a boarding site of the public transportation service, and the link information includes a link connecting the nodes denoting the locations of the boarding site and the parking lot. When the public transportation service is railway, the node information includes nodes denoting the locations of the railway stations, and the link information includes links connecting between those nodes denoting the station locations. The node information may further include a node denoting the location of a railway station and a node denoting the location of a parking lot near the station, while the link information may further include a link connecting between those nodes. When a plurality of railway lines exist, such node information and link information may be configured for each railway line. Furthermore, the node information may include a node denoting a road near a station in addition to a node denoting the location of the station, and the link information may include a link connecting those nodes.

In a further aspect of the present invention, the memory means for storing public transportation service routes uses the link information and the node information to further store data related to walking routes as additional link and node information. The calculation means can calculate a route on foot based on the link information and the node information related to walking routes.

In another aspect of the present invention, the route guiding apparatus comprises a location detection means for detecting the current location, a memory means for storing map data, a traveling mode detection means for detecting the current traveling mode, and a correction means for correcting the detected current location by correlating the map data in accordance with the traveling mode. To determine the current location with a high precision, map matching (MM) processing is effective. In MM processing, the current location detected via GPS or other means is correlated with the map data and matched to an appropriate location within the map data. When traveling by vehicle, the current location can be accurately determined by referring to the road closest to the detected current location or the most appropriate point on the road (such as an intersection). However, such MM technique cannot be directly implemented when traveling via a public transportation route because the traveling mode is not by vehicle. Whereas the conventional MM technique can be used to correct the current location when traveling by vehicle, the railway service schedule is used to correct the current location when traveling via railway. When traveling on foot, MM may not be executed. In this way, the current location can be corrected using different processing algorithms in accordance with each traveling mode, allowing precise detection of the current location even when traveling using public transportation.

Still further, the present invention provides a computer-readable medium on which is recorded a program for searching a route leading to a destination. By executing the program, a computer performs the steps of (a) searching for a route using vehicle only to reach the destination, (b) calculating the cost of the route using vehicle only, (c) searching for a route using public transportation, (d) calculating the cost of the route using public transportation, and (e) outputting the route using public transportation when the cost of the route using public transportation is smaller by a predetermined value or more compared to the cost of the route using vehicle only. The medium may include any arbitrary medium that can store information electromagnetically, optically, or chemically, such as a CD-ROM, DVD, FD, hard-disk, and semiconductor memory. The program stored in the medium is installed in the computer and executed by the processor of the computer.

DESCRIPTION OF THE PREFERRED EMBODIMENT

A preferred embodiment of the present invention is described below with reference to the accompanying drawings.

Figure 1:
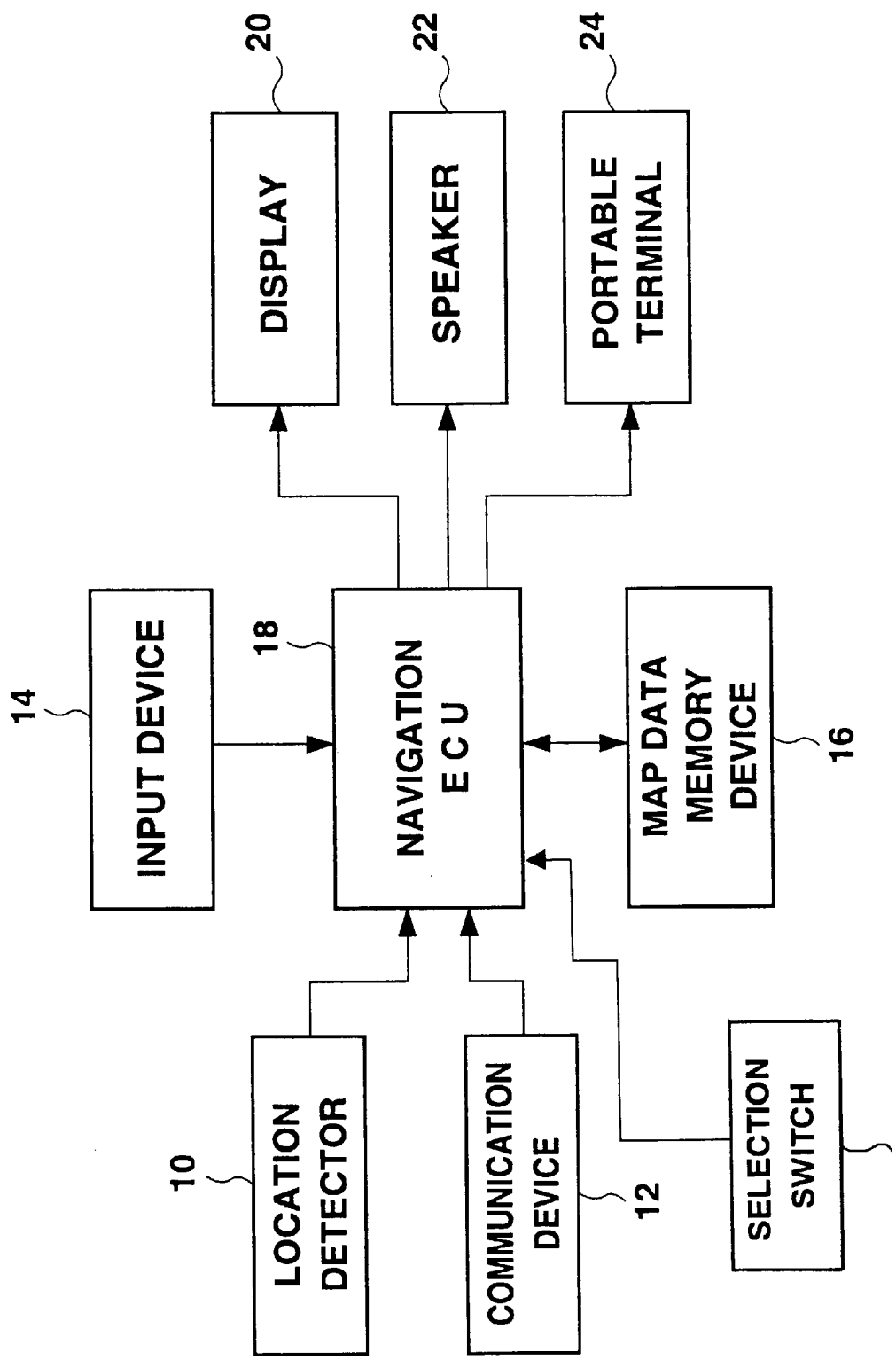
FIG. 1 is a block diagram showing the configuration of an embodiment of the present invention.

FIG. 1 is a block diagram showing the configuration of an embodiment of the present invention. The location detector 10 is configured using GPS (or DGPS), a vehicle velocity sensor, and an orientation sensor. The location detector 10 determines the current location of the vehicle and supplies the information to the navigation ECU 18.

The communication device 12 may comprise a light or electric wave transceiver. The communication device 12 acquires information such as traffic information and parking lot information from external information centers, and supplies those information to the navigation ECU 18. The traffic information includes information concerning accidents, traffic congestion, and required time for traveling through a road. The parking lot information includes vacancy information for certain parking lots.

The input device 14 comprises operation buttons and touch switches. Using the input device 14, the user inputs the destination. The input destination is supplied to the navigation ECU 18.

The map data memory device 16 may be configured with a CD-ROM, DVD, or hard-disk. The map data memory device 16 stores map data and supplies the map data in response to requests from the navigation ECU 18. The map data memory device 16 further stores, in advance, zones in which public transportation can be used, or public transportation zones. By correlating a location with the public transportation zones, the availability of public transportation in a particular location can be determined. A public transportation zone can be designated based on the availability of public transportation. For example, a mountainous area may not be designated a public transportation zone, while regions near urban areas such as Tokyo and Kanagawa are designated to be within a public transportation zone. Areas within a predetermined distance away from a railway station of Japan Railway lines or other private lines, a ferry boarding dock, an airport, and other such facilities are designated as public transportation zones. A public transportation zone may be defined by latitude and longitude values, or by the name of the region.

The navigation ECU 18 comprises a microcomputer. The navigation ECU 18 indicates on the display 20 the current location detected by the location detector 10 and the map data for display purposes which is read out from the map memory device 16 for use in displaying the area around the current location. Further, the navigation ECU 18 searches for a route leading to the destination supplied from the input device 14 based on the map data for search purpose stored in the map memory device 16 and the public transportation zone data. The navigation ECU 18 then provides a route guide by indicating the obtained route on the display 20 or outputting audible route guidance via the speaker 22. When conducting a route search, the navigation ECU 18 takes into account the traffic information and the parking lot information supplied from the communication device 12. Known methods, such as the Dijkstra method, can be used to search a route. The road data may be configured as connection data of links and nodes, and, among routes leading from the current location to the destination, the route having the smallest link cost is selected as the optimal route. A link cost is determined based on the distance and type of the link. Furthermore, the traffic information supplied from the communication device 12 is used in calculating the link cost during the search. At a stage when no traffic information is acquired, the route search is performed using link data (including link cost) stored in advance in the map data memory device 16 (such route search is referred to as static route search). When traffic information is acquired, routes are re-searched by reflecting the traffic information in the link cost (such route search is referred to as dynamic route search). A dynamic route search is a route search conducted in accordance with the actual road conditions, for finding an optimal route under the present road conditions. As a dynamic route search must be based on the most recent traffic information, the route search may be performed outside the navigation ECU 18. Specifically, the destination may be transmitted to an external information center via the communication device 12, and the information center performs a dynamic search for a route to the destination. The navigation ECU 18 can then receive the route data obtained by the search from the information center. The navigation ECU 18 searches not only for a vehicular route, but also for a route using public transportation through the use of the public transportation data included in the map data for search purpose. Although public transportation may include railways, airplanes, ships (including ferries), and other forms of public transportation, the present embodiment is described using railways as an example.

The portable terminal 24 is connected to the navigation ECU 18, and stores route data (static route data or dynamic route data) supplied from the navigation ECU 18. When the user detaches and carries the portable terminal 24, the portable terminal 24 indicates the route data to the user in response to the user's operation. The portable terminal 24 comprises at least a processor, a memory, a display, and an input device, and may further include the function of a cellular telephone. The connection with the navigation ECU 18 may either be established in a wired or wireless manner.

Figure 2:
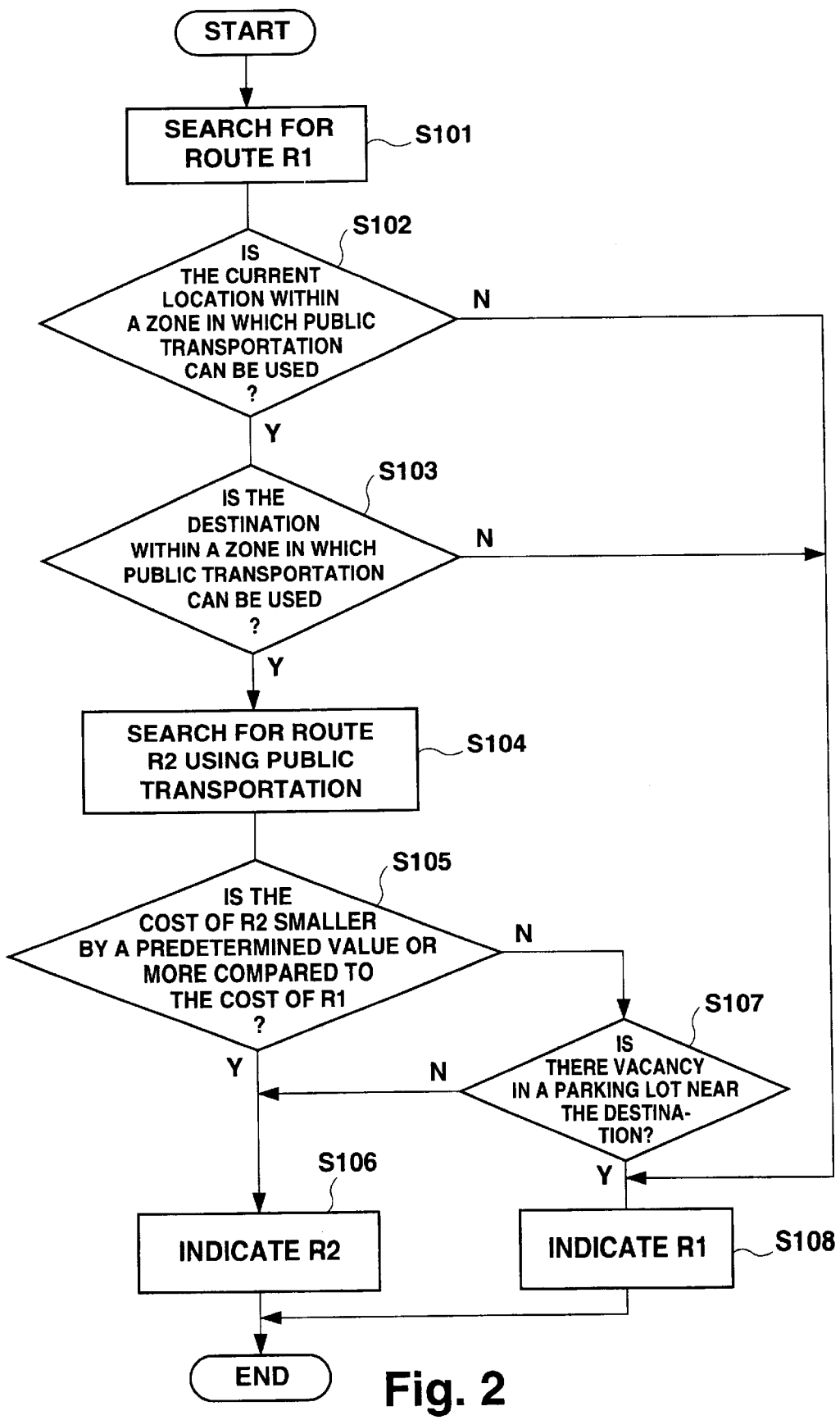
FIG. 2 is a flowchart showing processing of the present invention.

FIG. 2 is a flowchart showing a processing by the navigation ECU 18 of the example of the preferred embodiment. When the destination is input, the navigation ECU 18 searches for a vehicular route R1 to the destination (S101). The vehicular route R1 is a route which allows the user to reach the destination by vehicle only, in other words, a route to the destination using roads only. A static route is searched when information such as traffic information is not acquired by the communication device 12, while a dynamic route is searched when such information is acquired.

After the search for route R1, the navigation ECU 18 judges whether the current location of the vehicle detected by the location detector 10 is within a public transportation zone (S102). This judgement is conducted by correlating the current location with the public transportation zone data stored in the map data memory device 16. When, for example, the current location is in an urban area and is judged to be within a public transportation zone, the navigation ECU 18 subsequently judges whether or not the destination is within a public transportation zone (S103). This judgement can similarly be made by correlating the destination with the public transportation zone data. Alternatively, this judgement process may be performed by searching for a station closest to the destination, and determining through calculation whether the destination is within a predetermined distance (e.g., within 1 km) or within a 15-minute walk from the station.

When both the current location and the destination are in the public transportation zone, the option of using railway, a form of public transportation service, may be available. Accordingly, the navigation ECU 18 searches for a route using public transportation R2 (S104). The route using public transportation R2 can be determined in the following manner. Stations closest to each of the current location and the destination are first searched for. A route from the current location to its nearby station is then found by a method such as the Dijkstra method. When a train timetable data is stored in the memory device 16 (when not stored, this data may be acquired from an information center via the communication device 12), it is preferable to collate the estimated arrival time of the user by vehicle at the nearby station with the departure time of the trains from the station, so as to confirm whether the user can catch a train. It is further preferable to acquire parking lot information for the nearby station via the communication device 12 to confirm whether there is vacancy in a parking lot near the station, and, when there is such a vacancy, decide whether to use this station. When the train schedule is inconvenient or does not allow the user to board a train, or when the vehicle cannot be parked due to full parking lots at the nearby station, a route to the next closest station from the current location is searched for. Confirmations concerning the train schedule and the parking lots are similarly performed for the next station. After deciding from which station to board the train, a route from the station near the destination to the destination is determined. These obtained routes are then connected to generate route 2.

When searching for route R2 as described above, it is also possible to perform the search while ignoring the information concerning vacancy in a parking lot at a nearby station. For example, when a user on the way to the destination is riding a vehicle driven by another person, namely, when the user is chauffeured by another, there is no need to park the vehicle at the nearby station. In such cases, it is preferable to search for a route which uses a public transportation service from the nearby station regardless of whether or not there is vacancy in a parking lot near the station. Specifically, in the configuration of FIG. 1, a selection switch 13 is provided for selecting whether to consider or ignore parking lot vacancy information. When this switch is set at "consider model", the ECU 18 searches for route R2 upon confirming whether or not there is vacancy in the parking lot at the nearby station, as described above. When the switch is set at "ignore mode", the ECU 18 searches for route R2 using the nearby station, while ignoring the parking lot vacancy information (or without acquiring parking information). The selection switch is preferably disposed in a position operable by the user. For example, the switch may be a "chauffeur mode switch". When the chauffeur mode switch is turned on, the "ignore mode" is set to ignore the parking lot vacancy information. When the chauffeur mode switch is turned off, the "consider mode" is set to execute the search for route R2 by considering the parking lot vacancy information. The ignore mode may be selected in cases other than when being chauffeured, such as in an emergency when the arrival time at the destination is more important than availability of a parking space.

After the search for routes R1 and R2, the navigation ECU 18 compares the cost of route R2 and the cost of R1 to determine whether the cost of route R2 is smaller by a predetermined value or more compared to the cost of R1 (S105). A cost of a route is a concept including time and fees. For example, a route cost may be calculated as follows: route cost=time cost+financial cost. The time cost and financial cost may be, as is, the values of time (h) and fees (yen). When the destination can be reached in a shorter time or at a lower fee, the route cost is smaller. Apparently, it is also favorable to introduce weights as included in the equation of route cost=α·time cost+β·financial cost, and designate α and β as appropriate. When α=0, cost comparison is performed considering only the financial cost. When β=0, only the time cost is taken into consideration for cost comparison. In a comparison of a road routevehicular route R1 and a railway route 2, it is preferable to set β at a value other than 0 because ticket fees are generated. The navigation ECU 18 may set α and β at fixed values. Alternatively, the system may be configured such that α and β can be adjusted by the user through the input device 14. In this case, messages such as "Is time more important?" or "Are the expenses more important?" are indicated on the display 20. When the user selects time as the priority, α>β is designated. α<β can be set when the user selects the expenses as the priority. Furthermore, the system may be configured such that the user can adjust the predetermined values. The cost sizes of route R2 and route R1 may be compared while the predetermined values are set at 0.

When, as a result of the comparison, the cost of route R2 is found to be smaller by a at least predetermined amount compared to the cost of route R1, it can be determined that there is a merit in selecting route 2. Route 2 is therefore indicated as the guide route to the user through the display 20 and the speaker 22 (S106).

When, on the other hand, the cost of route R2 is not at least a predetermined amount smaller than the cost of R1, route 1 is generally indicated because there is no merit in offering route 2. However, when there is no vacancy in parking lots near the destination, route R1 cannot be selected. Accordingly, before indicating route R1, the navigation ECU 18 judges whether there is vacancy in a parking lot near the destination (S107). This judgement process can be performed by requesting an information center for information concerning parking lots near the destination via the communication device 12, and then judging based on the parking lot information transmitted from the information center in return. When there is vacancy in a parking lot near the destination, route R1 is indicated (S108). When there is no parking lot vacancy, route R2 is indicated because route R1 cannot be selected (S106).

There may be a case when, after indicating route R1 upon confirming vacancy in a parking lot near the destination, the parking lot becomes full due to the arrival of other vehicles. It is therefore preferable to periodically confirm whether vacancy remains in the parking lot near the destination even after displaying route R1 in S108. When a parking lot previously vacant but is later found to be full, a new route R2 (route R2 newly determined using the current location as the originating location) can be indicated at that point.

When, after indicating route R1, the communication device 12 acquires a traffic regulation information concerning route R1 such as a stop of traffic due to an accident, it may be preferable to indicate a new route R2 (route R2 newly determined using the current location as the originating location) at that point.

Concerning route R2, it may be preferable to indicate R2 only when there exist a plurality of public transportation service routes leading to an area near the destination. In a vehicular route, even when some abnormality occurs in the road, a destination can often be reached by detouring to other roads. However, where there exists only one service route leading to an area near the destination, it becomes difficult to reach the destination when some abnormality occurs in that service route. Accordingly, it may be limited so that route R2 will only be indicated when there exist a plurality of service routes to reach near the destination, thereby offering more reliable routes capable of dealing with abnormalities.

When indicating route R2, it is preferable to simultaneously indicate the return route because the user will also use railway to return from the destination to the vehicle. Specifically, as the user parks the vehicle at a parking lot near the station to board the train, the user must return to the parking lot before the closing time of the parking lot. For this reason, information such as the time that the user should board the train at the station near the destination for the return trip may be indicated. Such time to board the train at the station near the destination can be determined by referring to a train timetable obtained via the communication device 12.

Figure 3:
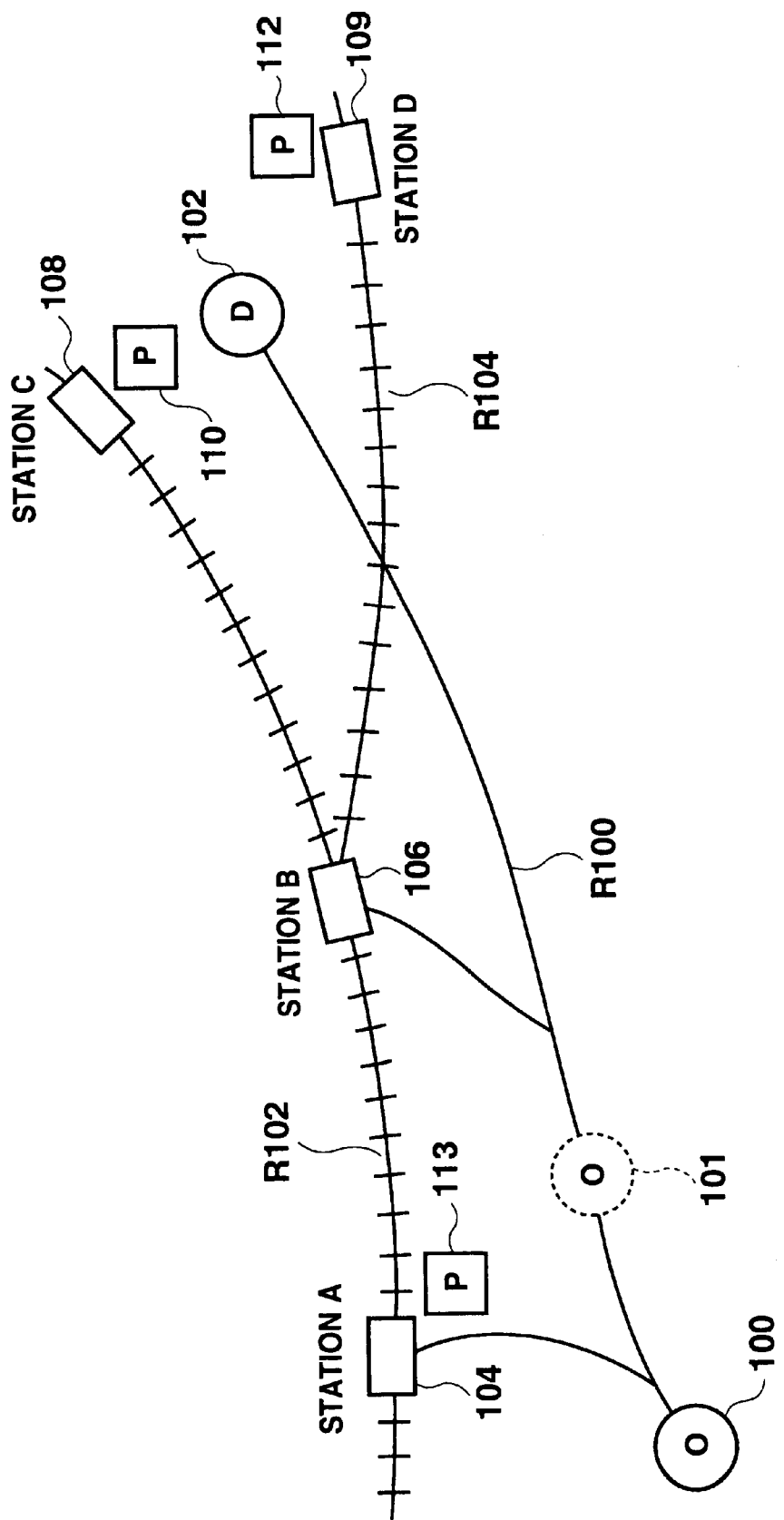
FIG. 3 is a diagram for explaining the processing of FIG. 2.

The above-described processing is more explained in more detail in the following with reference to FIG. 3. In this figure, a route from the current vehicle location (O) 100 to the destination (D) 102 is searched for. Station A of railway line R102 is located near the current location 100. Near the destination 102, station C 108 of railway line R102 and station D 109 of railway line R104 are located. Railway line R104 branches off from railway line R102 at station B 106. From station A, one can reach not only station C, but also station D by transferring at station B. Parking lot 110 is located at station C, parking lot 112 at station D 109, and parking lot 113 at station A. In this example, a vehicular route from the current location 100 to the destination 102 is first determined. Subsequently, a route using railway line R102 is searched for because station A 104 railway line R102 is located near the current location 100, and also station C 108 near the destination 102. Concerning the search in railway line R102, the route using railway line R102 is reasonably assured of arrival at the destination because station D 109 is present near the destination in addition to station C 108. During the search for the railway route R2, the availability of parking space in parking lot 113 at station A 104 and the waiting time before boarding the train are considered in deciding from which station, station A 104 or B 106, to board the train. Subsequently, the cost of the vehicular route and the cost of the railway route R2 are calculated and compared. The calculation of the cost of the route using railway line R102 takes into account the waiting time before boarding the train at station A 104, the ticket fee from station A to station C, and the time required to travel from station C to the destination by walk or other transportation means. If the cost of the route using railway line R102 is smaller than the vehicular route cost by at least a predetermined value, the route using railway line R102 is indicated. If not, the condition of parking lots near the destination is confirmed. The vehicular route is indicated when there is parking lot vacancy, and when no vacancy exists in the parking lot 110, the route using railway line R102 is indicated.

After the vehicular route is indicated, when the condition of the parking lot at the destination changes from vacant to full at the point that the vehicle reaches the location 101, a route search is conducted in railway line R102 using station B 106 as the nearby station.

After the route using railway line R102 is indicated, the user carries the portable terminal 24 when boarding the train at station A 104 or station B106, As the portable terminal 24 retains the route data supplied from the navigation ECU 18, the user is informed of the boarding time, the destination station, the route from the destination station to the destination, and other information.

When a train is to be boarded from station A 104, the closing time of parking lot 113 is acquired. To assist the user to return to the parking lot 113 before its closing time, the times for departure from station C 108 and from the destination 102 are calculated and stored in the portable terminal 24. For example, the closing time of the parking lot 113 may be 10:00pm. When the required time to travel from station C to station A is 1 hour, and the required time between station C to the destination 102 is 10 minutes by walk, the information that the destination should be departed by 8:50pm is indicated. In this way, the user need not needlessly worry about when to start the return trip.

In the example described above, when route R2 is usable, route R2 is searched and the costs of route R1 and route R2 are compared. It is also preferable to compare the estimated arrival times for the static route RS1 and the dynamic route RD1, and search for route R2 only when the dynamic route RD1 requires more time. When route RD1 requires more time than route RS1, the road to the destination is congested and there is merit in searching for R2.

Figure 4:
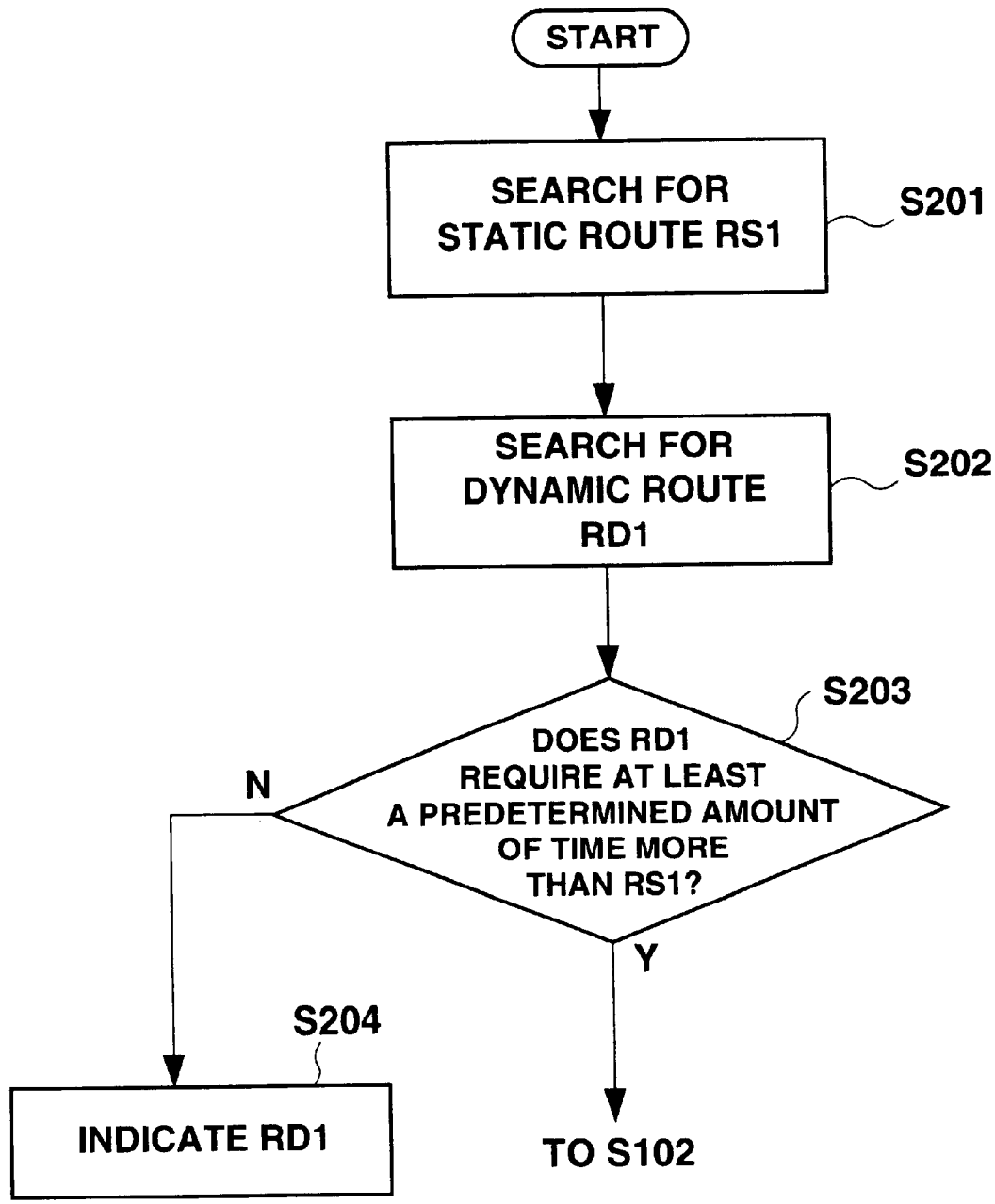
FIG. 4 is a flowchart showing additional processing of the present invention.

FIG. 4 is a flowchart showing the processing for such a case. The navigation ECU first searches for the static route RS1 by using the map data for route search purpose stored in the map data memory device 16 and without considering traffic information (S201). Subsequently, at the point when traffic information is acquired via the communication device 12, the navigation ECU searches for the dynamic route RD1 taking into account the traffic information (S202). The dynamic route RD1 may be searched for by the information center to be transmitted to the vehicle. The estimated arrival times for the static route RS1 and dynamic route RD1 are then compared to determine whether the estimated arrival time for the dynamic route RD1 is at least a predetermined time interval later than the estimated arrival time for the static route RS1 (S203). When determined to be later, traffic congestion is most likely generated in the vehicular route. In this case, the navigation ECU shifts to step S102 onward in the processing of FIG. 2 to search for route R2. On the other hand, when the estimated arrival time for the dynamic route RD1 is determined to not be later by the requisite interval, the traffic flow is relatively smooth. In this case, the search for R2 is not conducted, and RD1 is indicated (S204). In this way, it may be preferable to use the required travel times for the static route and the dynamic route as the criteria for judging whether or not to perform the search for a route using public transportation.

The flowcharts shown in FIG. 2 and FIG. 4 can be utilized by allowing the navigation ECU 18 to appropriately execute a control program. The control program may be recorded on an any preferable medium on which information can be electromagnetically, optically, or chemically stored including, but not limited to, a CD-ROM, DVD, hard-disk, and semiconductor memory.

The search for a route using public transportation is next described in more detail. The map data memory device 16 stores data concerning public transportation routes as links and nodes. In a conventional navigation apparatus, map data memory device 16 stores map data for road search purpose, and the navigation ECU 18 uses this road data comprising links and nodes to search for a route to the destination. In the present invention, the data on public transportation routes are also configured using links and nodes, thereby allowing searches for public transportation to be conducted in a manner similar to that for road searches. For example, when the public transportation is a railway, the railway route may be configured by providing nodes in the location of stations, and connecting the nodes with links. When a plurality of lines exist in the railway, each such line may be configured using nodes as the stations and links as the lines connecting those stations. A plurality of such configurations may be provided for a railway route not only when the railway route comprises separate lines but also when one service line is used for a local train and an express train. More specifically, one set of nodes and links may be configured for local trains, and another set of nodes and links for express trains.

When the current location of the vehicle is within a public transportation zone, the navigation ECU 18 uses the same algorithm used for the road data, namely, the Dijkstra method, to search for a route based on the public transportation data configured with links and nodes in a similar manner as the road data. In the present embodiment, as the public transportation data is configured with links and nodes similarly as the road data, the public transportation data and the road data can be connected seamlessly, allowing the navigation ECU 18 to perform road searches without particularly distinguishing the two data. In other words, the navigation ECU 18 executes route searches by treating the public transportation data as a part of the conventional road data. Although public transportation may include ships, ferries, buses and other means in addition to a railway, railway is used as an example to explain the present embodiment.

Using an illustrative example using railway as the available public transportation, the nodes and links of railway data stored in the map data memory device 16 are next described.

Figure 5:
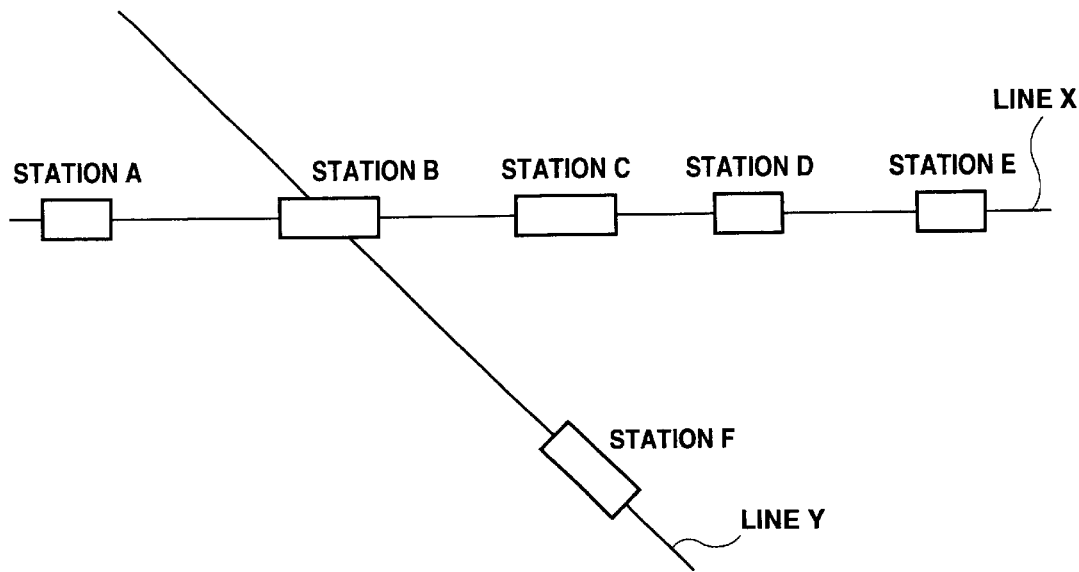
FIG. 5 is a diagram showing railway lines.
Figure 6:
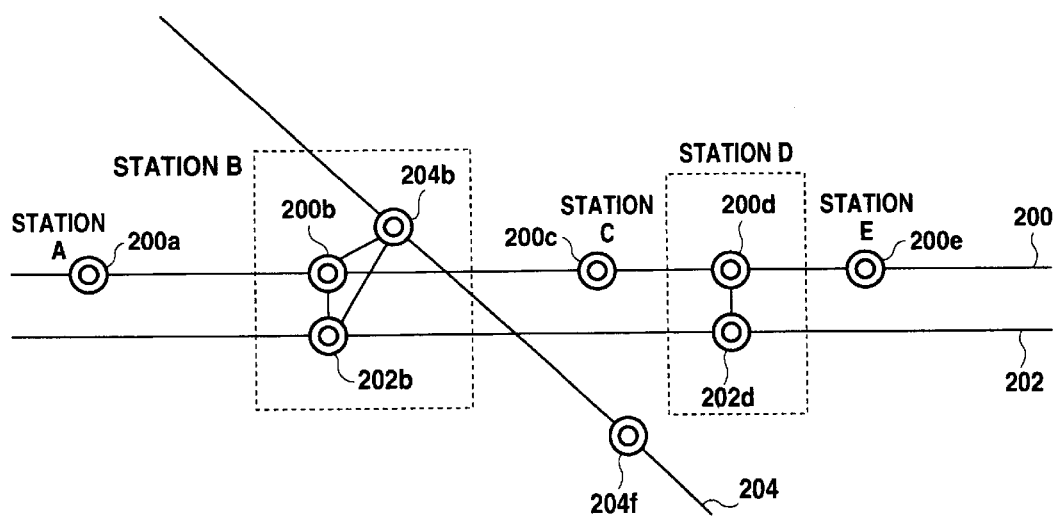
FIG. 6 is a diagram illustrating the railway lines of FIG. 5 using nodes and links.

FIGS. 5 and 6 illustrate an example usable railway route. As shown in FIG. 5, the railway route comprises line X and line Y. Line X includes stations A, B, C, D, and E. Stations B and F are located on line Y. FIG. 6 shows the links and nodes of the railway route shown in FIG. 5. On line X, a local train and an express (or limited express) train are operated. As the local and express trains have different stopping stations, nodes and links are separately configured for the respective trains. In the figure, reference numeral 200 denotes the nodes and links for the local train, while 202 denotes the nodes and links for the express train. The local train route 200 is provided with node 200a at a location corresponding to station A, node 200b at a location corresponding to station B, node 200c at a location corresponding to station C, node 200d at a location corresponding to station D, and node 200e at a location corresponding to station E. In addition, the links connecting those nodes 200a–200e are provided. The express train route 202 is configured with nodes 202b and 202d respectively in locations corresponding to stations B and D stopped by the express train, and the links connecting those nodes. Line Y is provided with nodes 204b and 204f respectively in locations corresponding to stations B and F, and the links connecting those nodes.

Concerning each of the stations B and D, as both the local and the express trains of line X make a stop, discrete nodes corresponding to the respective train routes are provided for an identical station. Specifically, as station B, node 202b for the express train exists in addition to node 200b for the local train. Similarly, as station D, node 200d for the local train and node 202d for the express train are provided. To take into account transfers from the local train to the express train or from the express train to the local train, a link is provided to connect those nodes for one station. Accordingly, a link connecting nodes 200b and 202b is provided at station B, and station D includes a link connecting nodes 200d and 202d. At station B, both line X and line Y provide their services. To take into consideration the transfers between lines X and Y, links interconnect the nodes corresponding to station B on both lines. More specifically, a link is provided to connect node 200b of the local train of line X and node 204b of line Y, and another link is provided to connect node 202b of the express train of line X and node 204b of line Y.

Summarizing the above, the basic algorithm for providing nodes and links is as follows.

(1) Nodes are provided for all train stations, and links arranged between the stations.

(2) Nodes and links are separately provided for each of express, limited express, and local trains.

(3) Links connect between nodes of (1) and (2) that correspond to an identical station.

(4) For one transfer station servicing a plurality of lines, separate nodes are provided for each of the lines.

(5) Links connect between nodes of (4) that correspond to an identical station.

Figure 7:
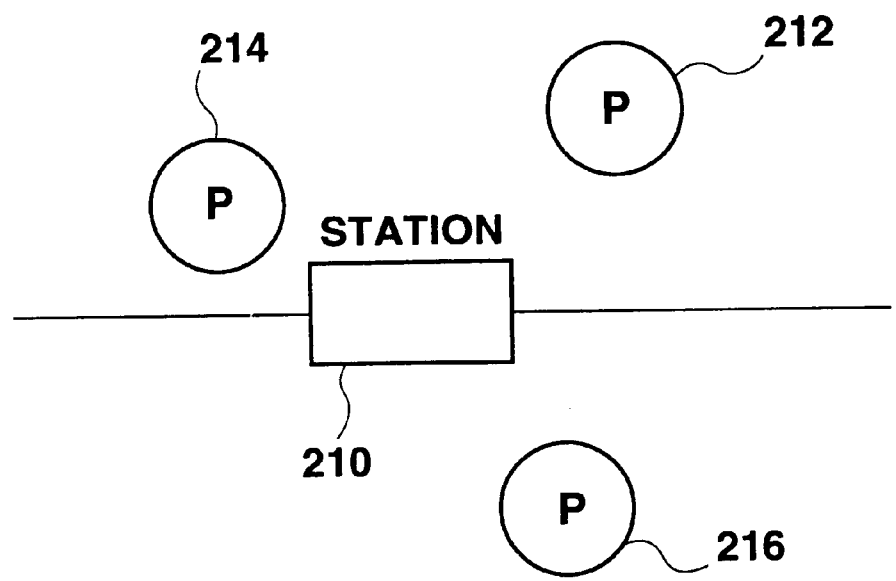
FIG. 7 is a diagram showing an arrangement of a station and parking lots located near the station.
Figure 8:
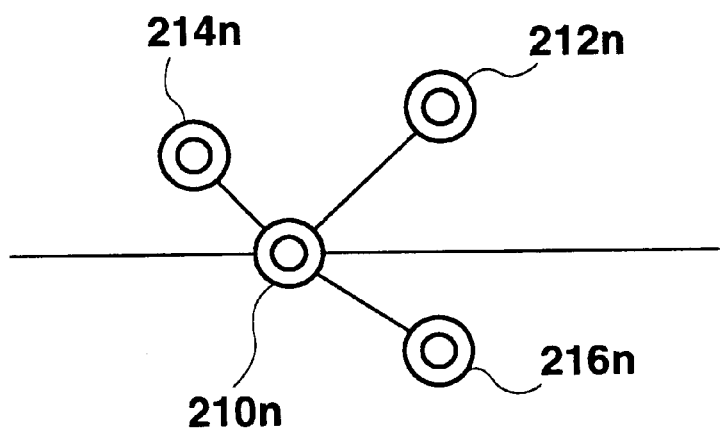
FIG. 8 is a diagram illustrating the arrangement of FIG. 7 using nodes and links.

FIGS. 7 and 8 show nodes and links associated with parking lots near a station. As shown in FIG. 7, three parking lots 212, 214, and 216 may be present near a station 210. For this case, node 210n denoting the location of the station 210 is provided according to the example of FIGS. 5 and 6. Additionally, as shown in FIG. 8, the nodes 212n, 214n, and 216n are provided to denote the locations of each parking lot 212–216. Links are further provided to connect each of the nodes 212n, 214n, and 216n denoting the parking lot locations to node 210n denoting the station location. The configuration principle of nodes and links for parking lots near a station is as follows.

(6) A parking lot location near a station is denoted by a node, and a link is provided to connect the node denoting the parking lot location and the node denoting the station location.

When the parking lot is relatively large and the vacant sections within the parking lot can be identified, it is favorable to use such a vacant section of the parking lot as a node.

Figure 9:
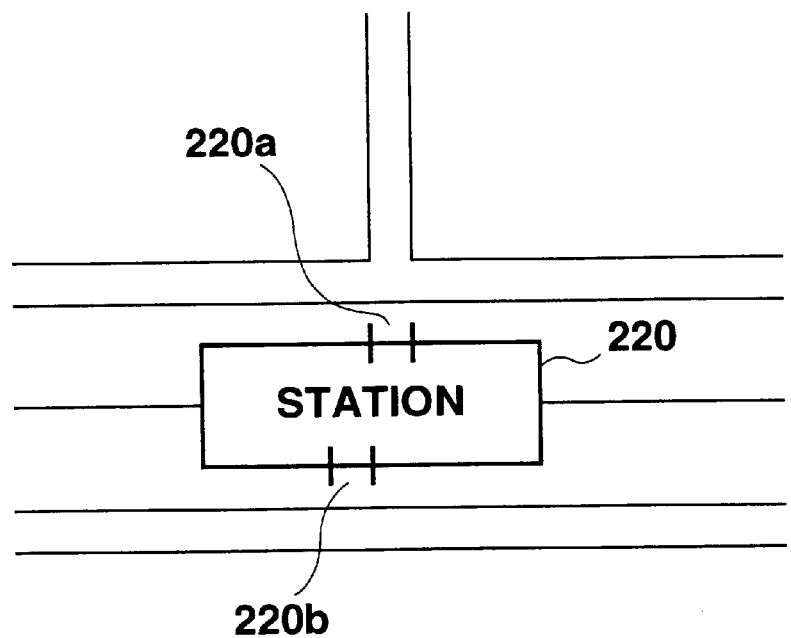
FIG. 9 is a diagram showing an arrangement of a station and roads located near the station.
Figure 10:
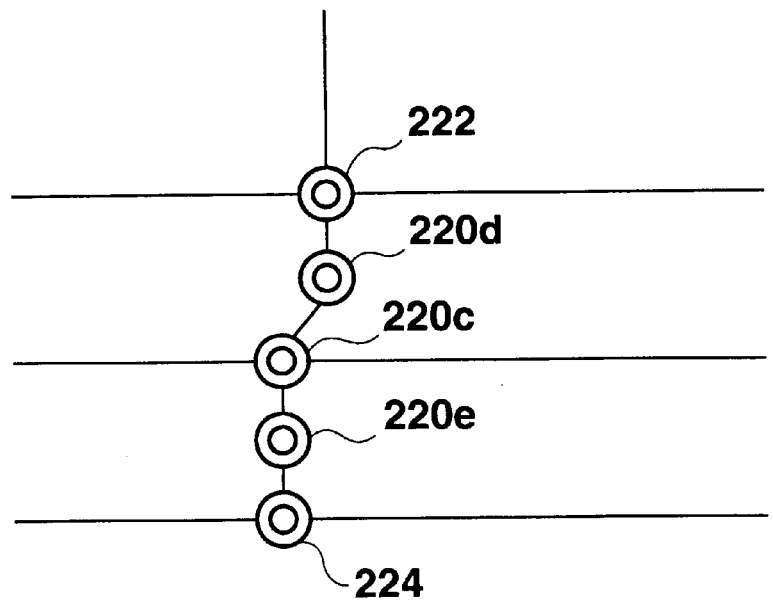
FIG. 10 is a diagram illustrating the arrangement of FIG. 9 using nodes and links.

FIGS. 9 and 10 illustrate the method employed in this preferred embodiment for configuring nodes and links for the premises of a station and the region around the station. As shown in FIG. 9, the station 220 has two exits 220a and 220b, and a road is located near each exit. In this case, as shown in FIG. 10, node 220c denoting the location of the station platform, node 220d denoting one station exit 220a, and node 220e denoting the other station exit 220b are provided as the nodes indicating the location of the station 220. These nodes are connected by links. Additionally provided are node 222 denoting the location of a road closest to exit 220a of the station 220 and node 224 denoting the location of a road closest to exit 220b of the station 220. Links are further provided to connect the nodes 222 and 224 denoting the road locations with the nodes 220d and 220e denoting the station exit locations. Nodes of the conventional road data may be used as the nodes 222 and 224 denoting the road locations. When the nodes corresponding to such road locations do not exist in the road data, those nodes are newly created. When nodes of the road data are used in this way, links would be provided to connect the nodes of the road data and the nodes denoting the premises of the station. When the road location nodes are newly created, links can similarly be provided to connect those nodes with existing road nodes. The configuration principle of nodes and links for the premises of a station and the region around the station is as follows.

(7) A node is provided for every exit of a station.

(8) When there exists a node near the station in the road data, a link is created between this node and the station exit node. When no such node exists in the road data, a new node is created to denote the location of a road closest to the station exit node, and a link is provided to connect the new node and the station exit node.

In a relatively small station having one or more exits, a single node denoting the location of the station may be used instead of providing nodes to represent those exits.

As described above, the premises of the stations, the railway line connecting the stations, and the areas around the stations are configured using links and nodes similar to those of the road data. The link cost of each link can be calculated basically according to the distance of the link. For example, the link cost (link travel time) of the link between a parking lot node and a station node is calculated by adding the walk travel time from the parking lot to the station and the time between the arrival at the station and the departure of the first train that can be boarded, namely, the waiting time. The walk travel time from the parking lot to the station can be calculated from the distance (and the standard walking speed). The waiting time can be calculated from the latest timetable data. The link travel time of a link connecting nodes within one station equals to the time required for transit, and can be calculated from the timetable data. When calculating the link travel time for a transfer of trains, it is necessary to consider the time required to travel between platforms. Specifically, while the link travel time is equal to the difference between the departure time and the arrival time, this calculation must be performed using a departure time that satisfies "link travel time>time required to travel between platforms". The time required to travel between platforms may be obtained based on the structure of the station. The link travel time of a link connecting between stations can be calculated from the timetable data. The link travel time from the dismounting station (station near the destination) to the destination can be calculated from the distance.

Link travel time is explained below using a specific illustrative example.

|  | Local 1 | Local 2 | Express 1 | Local 3 | Local 4 | Express 2 |
|---|---|---|---|---|---|---|
| Arrival at station A | 17:50 | 18:00 | — | 18:10 | 18:20 | — |
| Departure from station A | 17:52 | 18:02 | — | 18:12 | 18:22 | — |
| Arrival at station B | 18:00 | 18:10 | 18:12 | 18:20 | 18:30 | 18:32 |
| Departure from station B | 18:02 | 18:15 | 18:14 | 18:22 | 18:35 | 18:34 |
| Arrival at station C | 18:12 | 18:25 | — | 18:32 | 18:45 | — |
| Departure from station C | 18:14 | 18:27 | — | 18:34 | 18:47 | — |
| Arrival at station D | 18:22 | 18:35 | 18:30 | 18:42 | 18:55 | 18:50 |
| Departure from station D | 18:24 | 18:37 | 18:32 | 18:44 | 18:57 | 18:52 |
| Arrival at station E | 18:32 | 18:45 | — | 18:52 | 19:05 | — |
| Departure from station E | 18:34 | 18:47 | — | 18:54 | 19:07 | — |

In the present example it is assumed that timetable data as shown in the above table is acquired. Station A is the station closest to the current location from which a train is to be boarded. The user arrives at a vacant parking lot near station A at 17:48, and the required time to reach station A from the parking lot node on foot is three minutes (calculated from the distance and user walking speed). The estimated arrival time at station A is therefore 17:51. It is determined that the user can board the local train departing at 18:02 (local 2). In this case, the travel time of the link connecting the parking lot and the station, or the link connecting the node denoting the location of the parking lot and the node denoting the location of the station, is calculated as 3min+11 min=14 min. As can be seen, the link travel time of the link connecting the parking lot and the station dynamically changes depending on the departure time of the train that can be boarded.

The link travel time of a link between stations is calculated by computing the difference between the departure times at the stations. For example, the link travel time between stations when boarding the local train departing station A at 18:02 is as follows:

Link travel time between stations A and B=13 minutes

Link travel time between stations B and C=12 minutes

Link travel time between stations C and D=10 minutes

However, the link travel time between a dismounting station (for transit or for leaving railway) and a previous station is calculated as the time difference between the arrival time at the dismounting station and the departure time at the previous station. For example, when dismounting the train at station D, the link travel time of the link between stations D and C is:

Link travel time between stations C and D=8 minutes

The link travel time of a link within one station can be calculated by computing the difference between the departure time of the train to be boarded after the transfer and the arrival time of the train boarded before the transfer. In the case of a transfer from local train 2 to express train 1 at station B, the link travel time within station B is 4 minutes, assuming that the time required to make the transit is 1 minute. If the time required to make the transit exceeds 4 minutes due to the structure of the station, the travel time of the link within station B would equal to the difference between the departure time of the next express train, 18:34, and 18:10, that is, 24 minutes.

As described above, the railway stations and the areas around the stations are configured using nodes and links, each link cost (link travel time) is determined based on distances and timetable data, and the link cost is stored in the map data memory device 16. In such an arrangement, it is possible to employ a search algorithm based on link cost. As a result, even when the route from the current location to the destination comprises travel by vehicle→walking→public transportation→walking, the route search can be collectively performed using one algorithm because the route portion using public transportation is configured using links and nodes similarly as the vehicular route portions. The change in traveling means is not limited to the above, and the present embodiment can also deal with other changes in traveling means such as vehicle→walking→public transportation→vehicle→walking.

The present embodiment provides nodes to denote the locations of the station platforms and the station exits, and it is possible to guide the user to these nodes. It may also be preferable to add data concerning nearby buildings and other facilities as the accompanying data to those nodes. For example, in relationship with the node 220*d* or 220*e* denoting a station exit in FIG. 10, data informing that the exit is a north or a south exit, or that the exit is in the direction of a particular district or facility can be added, so as to more clearly identify the exit. When indicating a route obtained by a search to the user, the user can be guided to a particular exit more assuredly by indicating such additional information concerning the exit in text or other means, together with an arrow pointing at the exit node. It is apparent that such additional information may preferably be added not only to station exit nodes, but also to nodes 222 and 224 denoting road locations. For example, node 222 may be an intersection near a particular convenience store.

Although a walking route is determined using the road data in the present embodiment, it is possible to use, instead of the road data, nodes and links specialized for walking routes. For example, nodes may be provided at an appropriate distance apart to include pedestrian overpasses, pedestrian underpasses, narrow railroad crossings for pedestrians only, parks, and unoccupied areas. Links are then provided to connect those nodes, and the link costs designated according to the distances. A walking route can thereby be searched for using the same algorithm used for the road data. When such nodes and links for walking routes are provided, it is necessary to provide new links connecting between a parking lot node and a walking route node, and between a walking route node and a station exit node. By configuring pedestrian road data by using links and nodes, a more efficient and appropriate search for walking routes can be achieved.

Although the above example use railway as an example of a pubic transportation service, other public transportation means are also possible. When, for example, the pubic transportation service is bus, bus stops are designated as nodes, links are provided to connect those nodes, and the link cost (link travel time) for each link is calculated based on the bus timetable of departures and arrivals.

Figure 11:
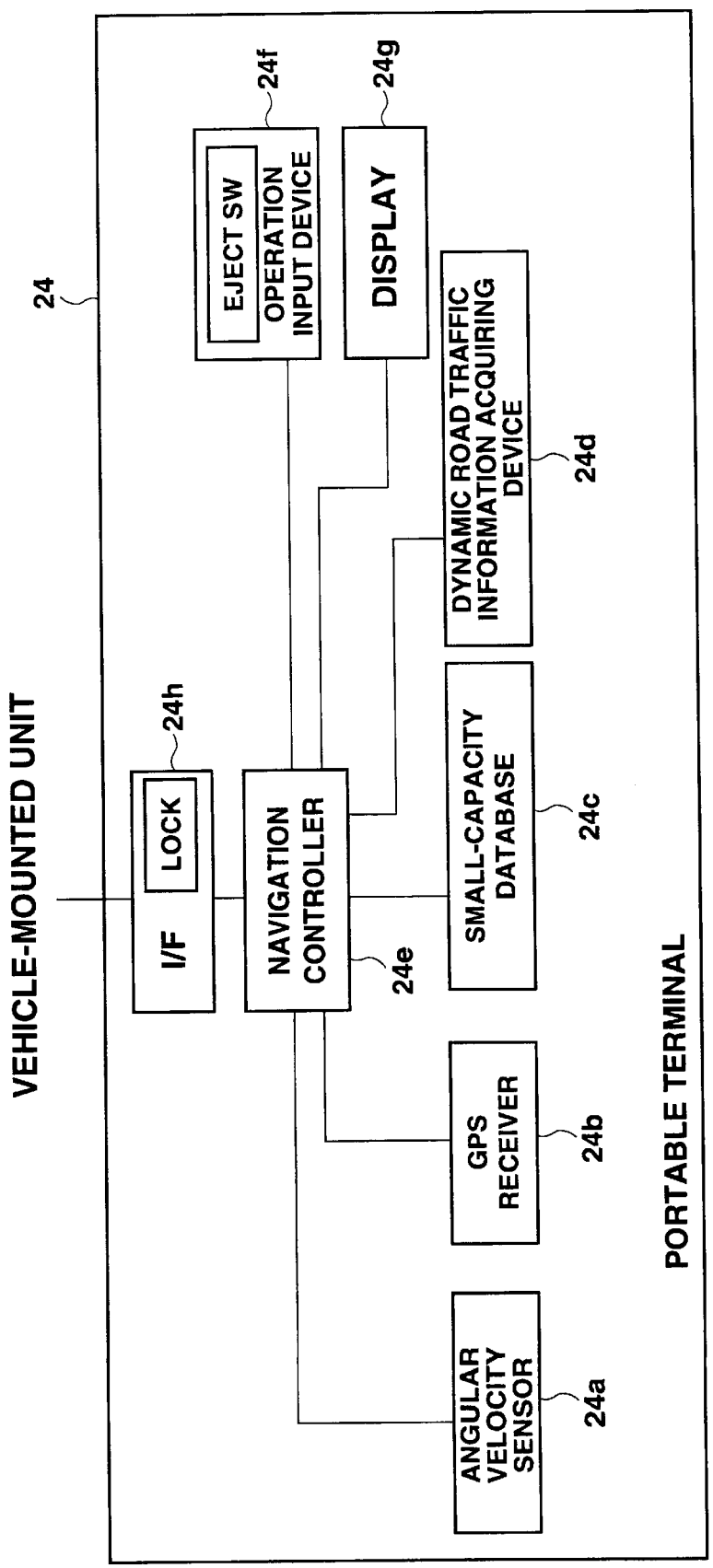
FIG. 11 is a block diagram illustrating the configuration of a portable terminal device shown in FIG. 1.

FIG. 11 is a block diagram showing the configuration of the portable terminal 24 of the present embodiment. The angular velocity sensor (gyro sensor) 24*a* detects the orientation of the vehicle, and supplies the information to the navigation controller 24*e*. The GPS receiver 24*b* is provided to receive signals from the GPS satellite and to supply the signals to the navigation controller 24*e*. The detected current location includes an error inherent to GPS. The navigation controller 24*e* corrects the detected current location by map matching (MM) using the map data, such that the current location is in accordance with the map data.

The small-capacity database 24*c* stores map data for displaying the map data of the nearby areas to the user when travelling by means such as walk or railway. The small-capacity database 24*c* may comprise a flash memory, a semiconductor memory, or a hard-disk.

The dynamic road traffic information acquiring device 24*d* is for acquiring traffic information from an external information center, and may be configured with a transceiver of electromagnetic waves or light. The acquired traffic information is supplied to the navigation controller 24*e*. The dynamic road traffic information acquiring device 24*d* is used when travelling by means such as walk or railway.

The operation input device 24*f* includes buttons and touch switches. The user inputs various information and commands through the operation input device 24*f*.

The navigation controller 24*e* is configured with a microcomputer. The navigation controller 24*e* receives input of signals from the angular velocity sensor 24*a* and the GPS receiver 24*b*, and detects the current location. The navigation controller 24*e* then collates the detected current location with the map data stored in the small-capacity database 24*c* to perform map matching (MM) correction. The corrected current location is indicated on the display 28 together with the map data.

Although the navigation controller 24*e* basically controls the functions of the portable terminal 24, the navigation ECU 18 of the vehicle-mounted unit may execute the functions of the navigation controller 24*e*. Specifically, the navigation controller 24*e* and the navigation ECU 18 may be configured as an identical ECU, thereby simplifying the overall system configuration. In such a case, when the portable terminal 24 is connected with the vehicle-mounted unit via the. interface (I/F) 24*h*, the navigation ECU 18 performs control for guiding the vehicle. When the portable terminal 24 is detached from the vehicle, the navigation ECU 18 performs control for guiding the user carrying the portable terminal 24. The following illustrates an example in which the navigation ECU 18 is integrated in the portable terminal 24 and simultaneously functions as the navigation controller 24*e*.

When performing the MM processing, the navigation controller 24*e* determines the current traveling mode, such that MM correction can be performed in accordance with each of the modes of travel by vehicle, railway, and walk. The current location is thereby determined very precisely, and then indicated on the display 28.

Figure 12:
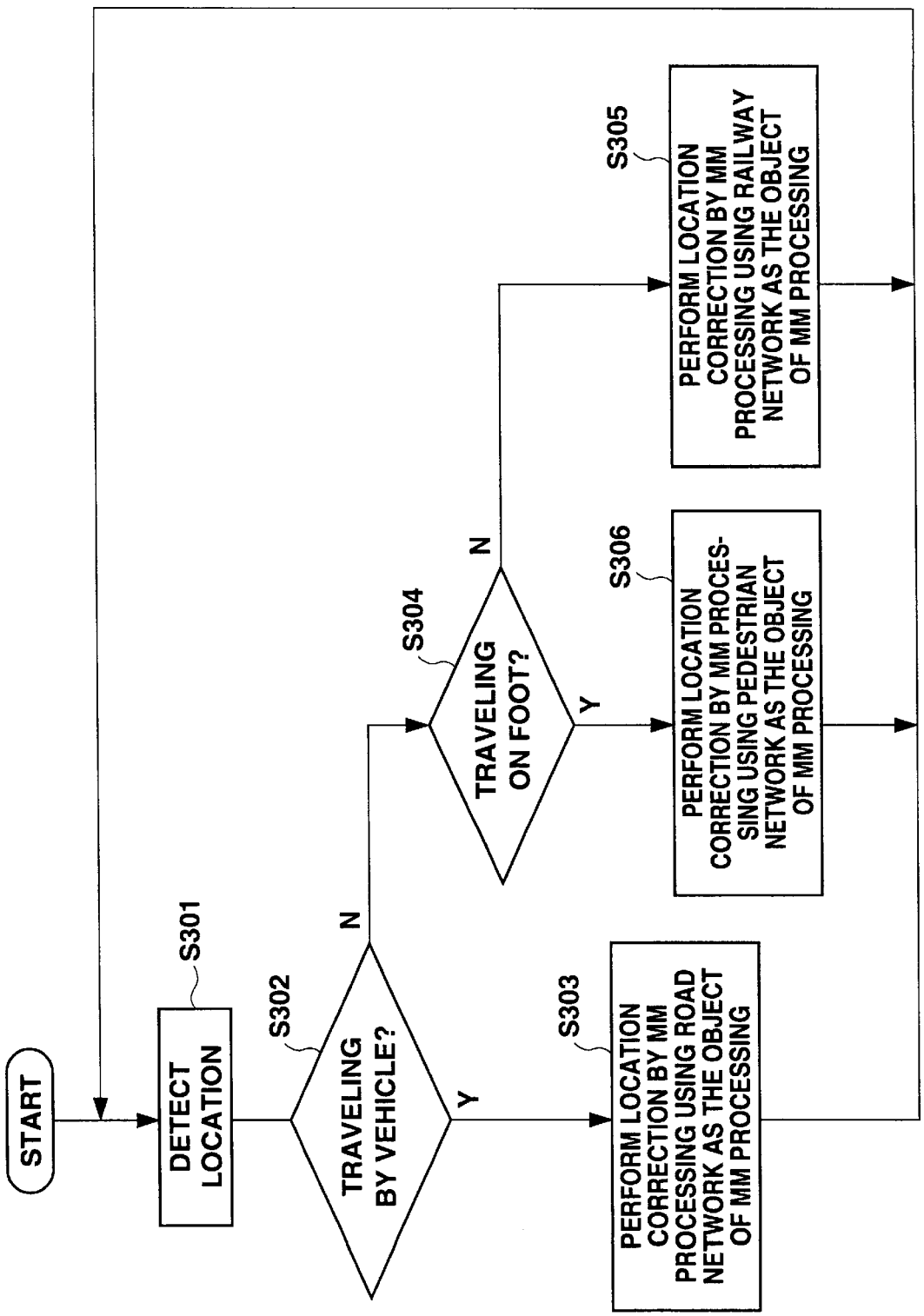
FIG. 12 is a flowchart showing processing in the portable terminal device of FIG. 1.

FIG. 12 is a flowchart showing the MM processing of the navigation controller 24*e*. After detecting the current location (S301), the navigation controller 24*e* judges whether the travel is made on road by vehicle (S302). It can be judged that the travel is made by vehicle when the vehicle-mounted unit and the mobile unit 24 are connected, and the user does not carry the mobile unit 24. More specifically, the vehicle-mounted unit and the mobile unit 24 can be connected by, for example, setting the mobile unit 24 in a cradle connected to the vehicle-mounted unit. By detecting whether or not the mobile unit 24 is removed from the cradle, the navigation controller 24*e* performs the above judgement. When the vehicle-mounted unit and the mobile unit 24 are connected and it is determined that the travel is made by vehicle, the navigation controller 24*e* designates the road data, from among the map data, as the object data of MM processing, and collates the current location detected in S301 with the road data to correctly re-position the current location to the nearest road or to an appropriate point on a nearby road (S303).

When it is determined that the mobile unit 24 is detached from the vehicle-mounted unit and being carried by the user, the navigation controller 24e determines that the travel is not made by vehicle. The navigation controller 24e then further judges whether the travel is made on foot (S304). This judgement can be made by detecting whether the detected current location is near a railway station, or by detecting whether the traveling speed is greater than the walking speed. The traveling speed can be detected using the time series information of the GPS signals detected by the GPS receiver 24b of the mobile unit 24. When the detected current location is not near a railway station, or when the traveling speed is at a predetermined level or lower, it can be determined that the user is traveling on foot. The navigation controller 24e then corrects the current location by using only the pedestrian road data, from among the map data, as the object of MM processing (S306).

When it is determined in S304 that the travel is not on foot and, therefore, by railway, the current location is corrected using only the railway data as the object of MM processing. The detected current location and the railway data are collated, and processing is performed to re-position the current location at a closest location on the service route. By eliminating the road data from the object of MM processing and using only the railway data during a travel by railway, the current location can be very precisely and quickly corrected even when a road extends along the railway line.

In performing the MM correction using the railway data, it may be preferable to execute the correction by using the train operation schedule, rather than by using the algorithm for re-positioning the current location to the closest location in the network data. When, after boarding a train, the train stops at a station (the stop can be detected from the time series information detected by the GPS receiver 24b), if the detected current location is within a predetermined range from the location of the station, MM processing is performed using the algorithm to re-position the current location to the location of the station. This processing is limited to a predetermined range from the location of the station to prevent incorrect execution of the re-positioning processing when the train does not travel according to the operation schedule, but stops in a location between stations due to a cause such as an accident. It is apparently preferable to perform the correction processing by acquiring data concerning the operation schedule via the dynamic road traffic information acquiring device 24d. Based on the operation schedule and with reference to the current time, the estimated location can be calculated. When the detected location is within a predetermined range from the estimated location, the processing to re-position the detected current location to the estimated location can be executed. According to this processing, location determination can be achieved at high precision while at a station and also at a location between stations.

By using the railway data as the object of MM processing as described above, MM correction can be performed reliably and quickly. In addition, by performing a correction processing differing from the MM processing for the road data, or more specifically, by performing the correction to re-position the detected current location to the estimated current location according to the operation schedule, a more precise correction of the current location can be accomplished.

Figure 13:
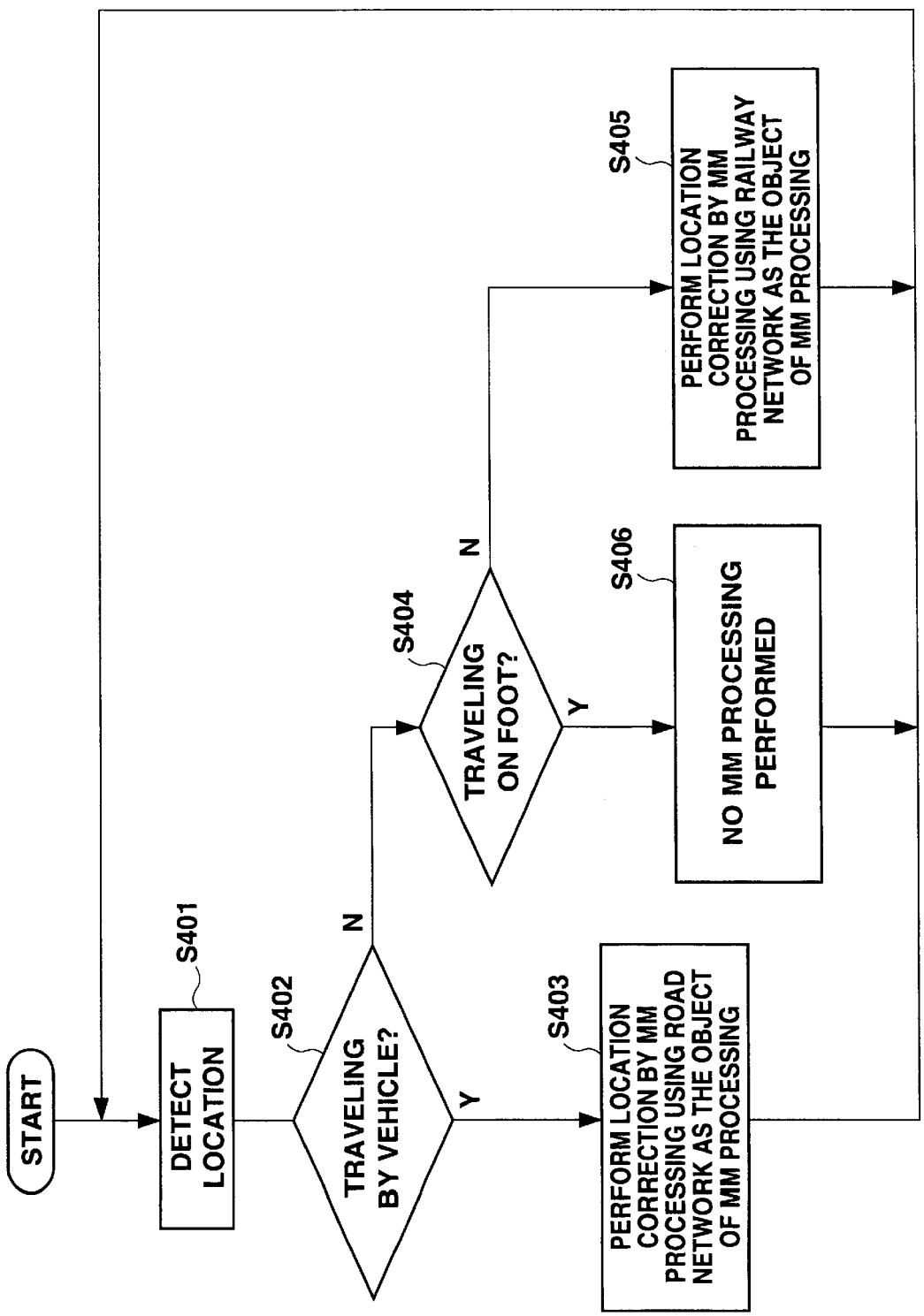
FIG. 13 is a flowchart showing additional processing in the portable terminal device of FIG. 1.

FIG. 13 is a flowchart showing additional processing of the navigation controller 24e according to the preferred embodiment of the present invention. The difference between this flowchart and the processing flowchart of FIG. 12 is the processing performed when the current traveling mode is determined to be walking. Specifically, in the above-described example, MM correction is performed by means of the same conventional algorithm and using the pedestrian road data as the object of MM processing. However, in an alternative embodiment, no MM processing is performed. Normally, the width of a pedestrian road is narrow, and the pedestrian roads are often spaced apart by a distance smaller than the possible detection accuracy of the GPS. Accordingly, if MM correction is performed to re-position the detected current location to the closest pedestrian road, the current location may be re-positioned in an incorrect road, thereby increasing error. No MM correction is performed when the current traveling mode is determined to be walking, so as to prevent degradation of location accuracy.

Again, while the present embodiment is described using railway as an example of public transportation, the present invention can be implemented for travel by other public transportation means such as bus and ship. In a case of travel by bus, very precise location determination is possible by using the bus route data as the object of MM processing. Furthermore, by performing MM correction using the bus operation schedule, the user can reliably be informed of the current location traveled by bus.

In the processing flowchart of FIG. 13, no MM processing is performed for all cases when it is determined that the travel is on foot. However, an arrangement is also possible wherein, when traveling by walking, a message is indicated on the display 28 to prompt the user to decide whether or not to perform MM processing, and MM processing is not performed when the user declines. Moreover, it may be preferable to perform no MM processing when there exist a predetermined number or more of pedestrian roads near the detected current location.

The processing shown in FIGS. 12 and 13 can be implemented by supplying a processing program from a medium storing the program to the navigation controller 24e which is a computer, and allowing the navigation controller 24e to sequentially execute the program. The storage medium may include any preferable medium on which can be electromagnetically, optically, or chemically stored information such as a CD-ROM, DVD, hard-disk, semiconductor memory, or the like.

Figure 14:
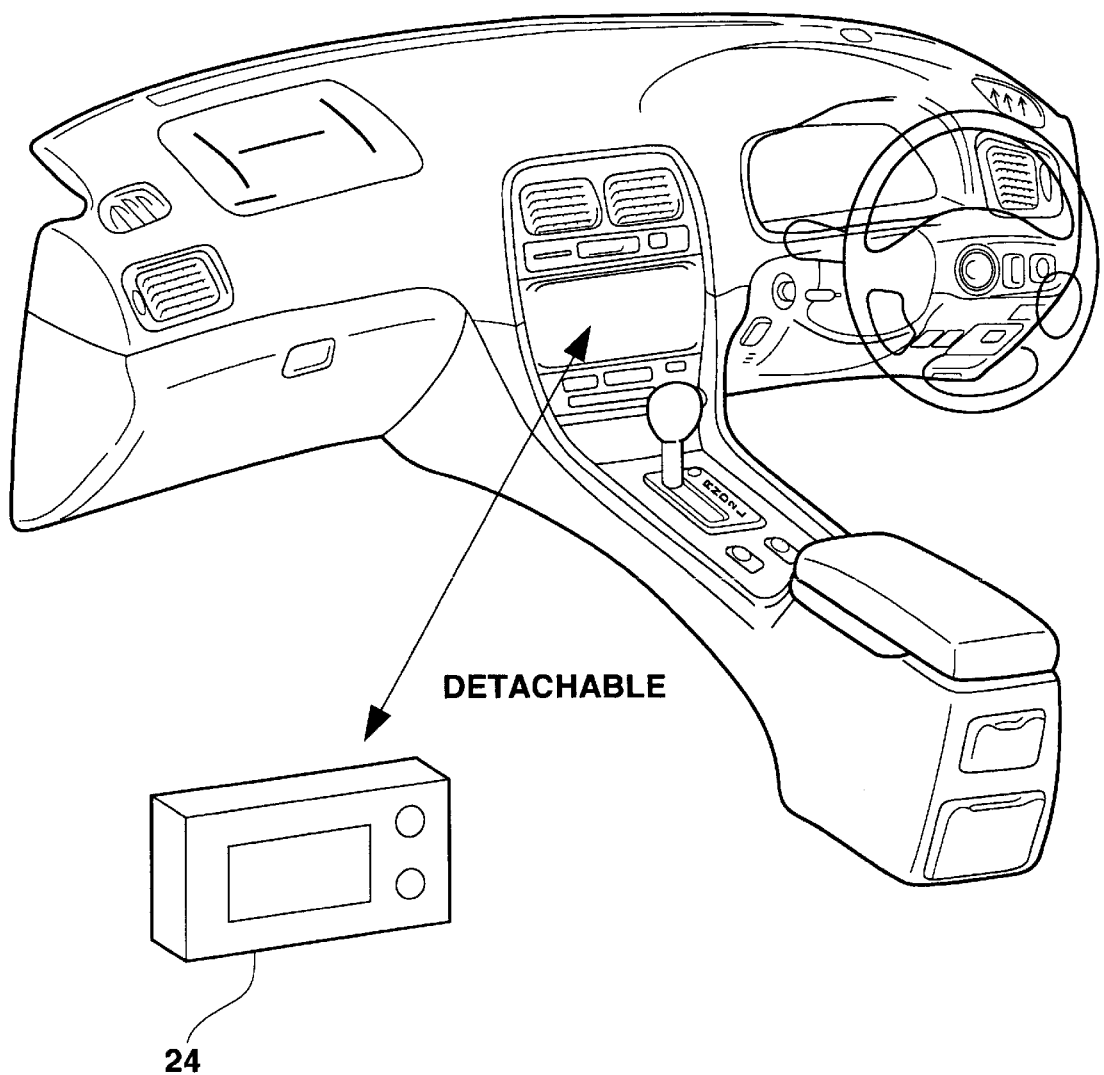
FIG. 14 is a perspective view around a driver's seat.

FIG. 14 is a structural diagram showing a view around a driver's seat in a vehicle according to the present invention. The vehicle-mounted navigation system is disposed in the instrument panel section inside the vehicle. The portable terminal device 224 is configured to be detachably mounted on the vehicle-mounted navigation system. When the vehicle is traveling, the portable terminal device 24 is integrated into the vehicle-mounted system and operates as a part of the vehicle navigation system. When the user uses public transportation such as railway, the portable terminal device 24 is detached from the vehicle-mounted system and carried by the user.

The interface (I/F) 24h comprises a connector, and functions to allow signal transmission to and reception from the vehicle-mounted system. The interface (I/F) 24h includes a lock mechanism for physically locking the connection between the portable terminal device 24 and the vehicle-mounted system. When the vehicle is in a predetermined traveling condition, the lock is activated to prohibit detachment of the portable terminal device 24 from the vehicle-mounted system.

When there is no need to detach the portable terminal device 24, or, more specifically, when the vehicle is traveling and has not yet arrived at the target parking lot, it is unfavorable to detach the portable terminal device 24 because the portable terminal device 24 is operating as a part of the vehicle navigation system. Accordingly, the navigation ECU 18 (or the navigation controller 24e) determines the vehicle traveling condition, and, when it is judged that the portable terminal device 24 should not be detached, activates the lock mechanism to prohibit detachment of the portable terminal device 24 even when the eject switch on the operation input device 24f is operated.

Figure 15:
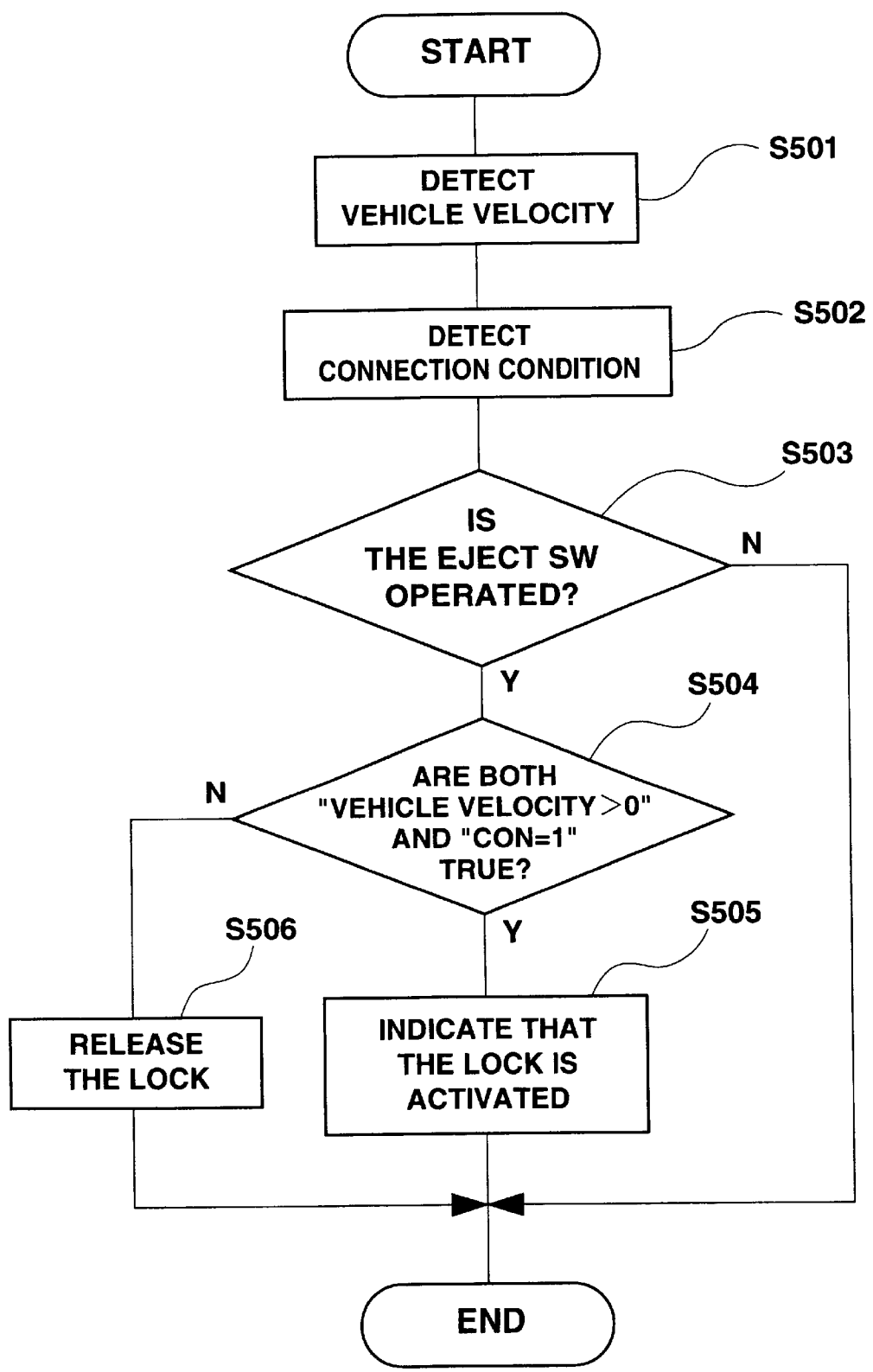
FIG. 15 is a flowchart showing a processing related to detachment of the portable terminal device of FIG. 1.

FIG. 15 is a flowchart illustrating the activation/release processing of the lock mechanism by the navigation ECU 18 (or the navigation controller 24e) according to the present embodiment. The navigation ECU 18 first detects the vehicle velocity (S501). Subsequently, the connection condition of the portable terminal device 24 is confirmed (S502). When the vehicle-mounted system and the portable terminal device 24 are connected, the interface 24h outputs a signal indicating CON=1 to the navigation ECU 18. Otherwise, a signal indicating CON=0 is output. By detecting the value of CON, it is therefore possible to determine whether the vehicle-mounted system and the portable terminal device 24 are connected. After detecting the vehicle velocity and the connection condition, the navigation ECU 18 judges whether the eject switch is operated, that is, whether the user intends to detach the portable terminal device 24 from the vehicle-mounted system (S503). When the eject switch is operated, the lock mechanism is not immediately released. Instead, the current vehicle traveling condition is determined by detecting whether "vehicle velocity>0", and whether "CON=1" (S504). When both "vehicle velocity>0" and "CON=1" are satisfied, the locking of the lock mechanism is maintained to prohibit detachment of the portable terminal device 24 because unlocking under such a condition would cause detachment of the connected portable terminal device 24 during traveling of the vehicle. In addition, a message is indicated on the display to inform the user that the detachment is prohibited (S505).

When the vehicle is stopped and the velocity=0, no problems result from detaching the portable terminal device 24 from the vehicle-mounted system. The navigation ECU 18 therefore releases the lock mechanism of the interface 24h to allow detachment by the eject switch (S506).

By prohibiting detachment of the portable terminal device 24 from the vehicle-mounted system during whenever the vehicle is traveling, detachment is prevented even when the user operates the eject switch by mistake, and the navigation function can be maintained during vehicle travel.

When the user parks the vehicle in a parking lot to board a train, if the user forgets to detach the portable terminal device 24 from the vehicle-mounted system, route guidance can no longer be appropriately provided to the user. To prevent the user from forgetting to detach the portable terminal device 24, the navigation ECU 18 of the present embodiment prompts the user to detach the portable terminal device 24 from the vehicle-mounted system.

Figure 16:
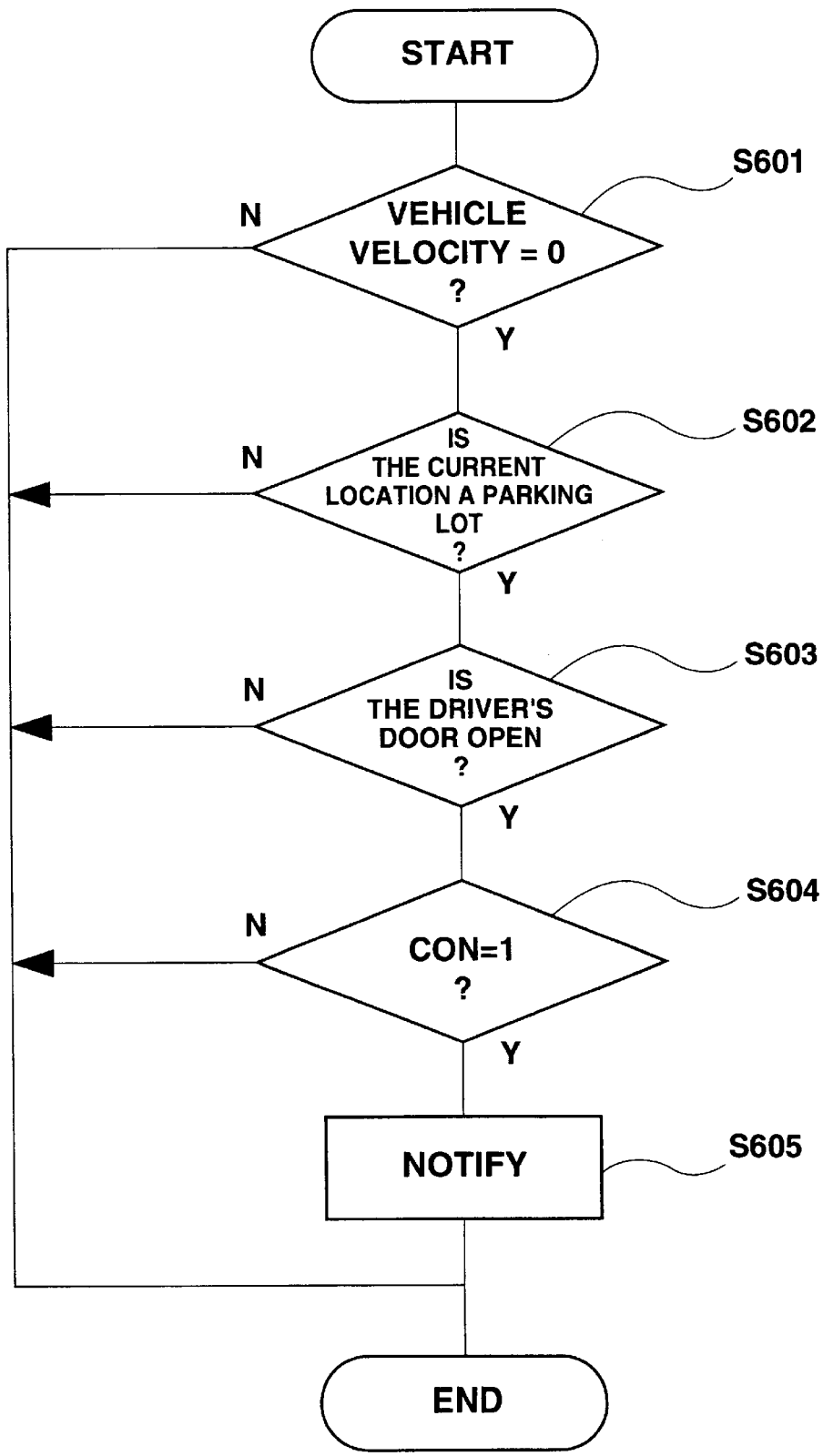
FIG. 16 is a flowchart showing another processing related to detachment of the portable terminal device of FIG. 1.

FIG. 16 is a flowchart showing the processing to prompt detachment of the portable terminal device 24. The navigation ECU 18 first determines based on the vehicle velocity whether the vehicle is traveling (S601). When the vehicle is not traveling, it is further judged whether the current location of the vehicle is in a parking lot and whether the user should detach the portable terminal device 24 (S602). When the vehicle's current location is in a parking lot, whether the door at the driver's seat is opened is detected based on, for example, a signal from a courtesy switch (S603). When the vehicle is parked in a parking lot and the user opens the driver's door, it is determined that the user intends to leave the vehicle. Subsequently, it is further judged whether the signal from the interface 24h is CON=1 (S604). When CON=1, the portable terminal device 24 is still connected to the vehicle-mounted system. The navigation ECU 18 then releases the lock mechanism, and indicates a message on the display informing that the portable terminal device 24 should be detached and carried (S605). It may be preferable to notify the user by an audio message such as "please carry the portable terminal device" via a speaker inside the vehicle.

As described above, the user is actively urged to detach the portable terminal device 24 when it is necessary to carry the. portable terminal device 24. Accordingly, the user is prevented from forgetting to carry the portable terminal device 24, and the route to the destination can be reliably presented to the user.

Based on the fact that the user frequently uses a predetermined parking lot, it may be predicted that the user knows well the route to the destination and has no need to carry the portable terminal device 24. In such a case, it may be annoying for the user to be urged to "please carry the portable terminal device" as described above. It may therefore be preferable to store the history of past route guides in a memory, determine whether a particular parking lot was previously used, and urge detachment according to the processing of FIG. 16 only when the vehicle is parked in a new parking lot. Specifically, in the processing flowchart of FIG. 16, a step can be provided between S602 and S603 to determine whether the current parking lot was previously used. The processing of S603 onward can then be performed only when the parking lot is being used for the first time.

While a lock mechanism is provided to prohibit detachment of the portable terminal device 24 in the present embodiment, detachment may be prohibited by invalidating the eject switch itself during vehicle travel.

In the embodiment of the present invention, it is necessary to standardize the unit of cost when calculating and comparing the respective costs of a route using public transportation such as railway and a vehicular route. Normally, a cost of a vehicular route is calculated in units of distance. However, a cost of a route using public transportation such as railway may be more easily calculated in units of time rather than distance, because a public transportation service is expected to be operated according to a timetable, and the required time from a point to another point is predetermined. Accordingly, the vehicular route cost calculated in units of distance and the public transportation route cost calculated in units of time are preferably standardized in units of time before comparing the two costs.

Figure 17:
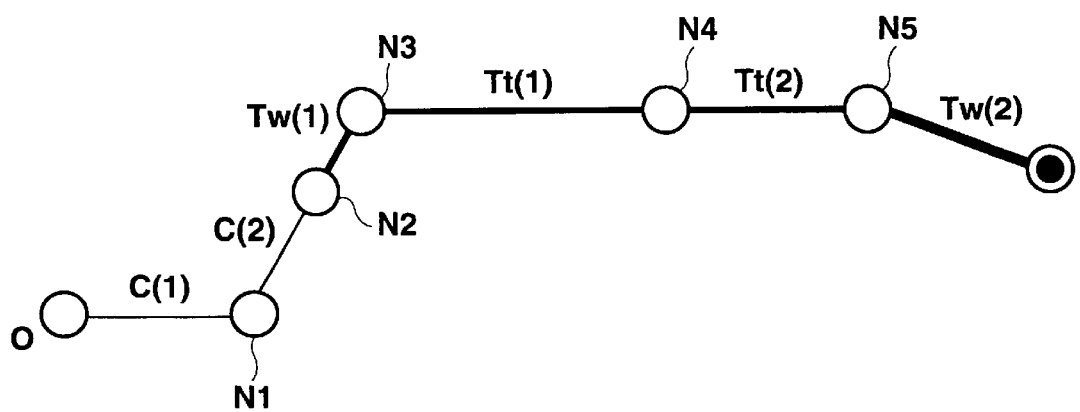
FIG. 17 is a diagram for explaining a processing for calculating a route cost in units of time.

FIG. 17 is a diagram for explaining the calculation of the route cost when traveling from the current location to station A by vehicle, from station A to station C by railway, and from station C to the destination on foot. In the figure, node N1 is disposed near the current location (O) at a location corresponding to a branching point. The link cost between the current location (O) and node N1 is assumed to be C(1) in units of distance. This distance cost is determined based on the distance, number of lanes, road type, and other such factors, similarly as a cost in a conventional route search. Node N2 corresponding to the parking lot is disposed near node N1. The link cost between node N1 and node N2 is assumed to be C(2) in units of distance. Node N3 denoting station A is provided adjacent to node N2 denoting the parking lot. The link cost between node N2 and node N3 is the required time Tw(1) to travel from the parking lot to station A. Node N3 of station A includes a cost in itself, and this cost is C(N3). This cost is determined according to the number of stairs and uneven paths, and the presence of escalators and elevators, in units of time. For example, when the time cost of a level 100 m path is determined as 100 seconds, the cost of a moving walkway may be 50 seconds. When the time cost of a staircase having approximately 50 steps is determined as 100 seconds, the cost for escalator may be 50 seconds, and the cost for elevator, 10 seconds. Similarly for node N4 of station B, when a transfer must be made at station B, the cost C(N4) associated with the node of station B is determined according to the transfer waiting time and the number of staircases and uneven paths that must be traveled to make the transfer. The link cost between node N3 of station A and node N4 of station B is the required train travel time Tt(1) between stations A and B. Node N5 corresponding to station C is located near node N4 of station B. The link cost between node N4 and node N5 is the required train travel time Tt (2) between stations B and C. Station C also includes a node cost in a manner similar to stations A and B, which may be determined according to the number of stairs and uneven paths traveled from the platform to the exit. The link cost between the node of station C and the destination is the required time Tw(2) to travel from station C to the destination. Accordingly, the total cost Ct of this route from the current location to the destination is given by $$Ct=C(1)/V1+C(2)/V2+Tw(1)+C(N3)+Tt(1)+C(N4)+Tt(2)+C(N5)+Tw(2) \quad (1)$$

In this equation, the first and the second terms are obtained by converting the vehicular route distance costs into time costs. V1 is the vehicle velocity designated for the link between the current location and node N1, and V2 is the vehicle velocity set for the link between node N1 and node N2. By dividing the distance cost by the vehicle velocity, the link cost can be converted into a time cost having the same unit as the cost of the public transportation route. A vehicle velocity set for a link is preferably determined according to the road type of the link. For example, 80 km/h may be designated for a speedway, 50 km/h for a regular road, 30 km/h for a city area road, 15 km/h for a narrow road, and so on.

Concerning the vehicular route from the current location to the destination, the associated cost Cv can be given by $$Cv=\Sigma Ci/Vi \quad (2)$$

wherein a link cost is denoted by Ci, and the vehicle velocity designated for each link is denoted by Vi. Specifically, the distance cost obtained by the conventional route search algorithm is divided by the designated velocity to compute the time cost.

In the manner described above, the navigation ECU 18 calculates the time cost of the vehicular route and the time cost of the public transportation route, and indicates the two costs to the user. The user can thereby easily recognize which route allows the user to reach the destination in a shorter time.

It may also be preferable to take into account the cost of each node in the vehicular route and the parking lot cost. The node cost in the vehicular route can be determined by the necessity to make right and left turns, and the presence of traffic lights. The node cost of a parking lot may be the parking fee. In general, when the link cost of the vehicular route is denoted by C(Ln), $$C(Ln)=L \cdot i \cdot K \cdot S \quad (3)$$

wherein L is the link distance, i is the coefficient for applying weight for short links, K is the coefficient based on the number of lanes, and S is the coefficient based on the road type. Furthermore, when C(Nn) denotes the node cost, $$C(Nn)=X+Y+Z \quad (4)$$

wherein X is the cost for right and left turns, Y is the traffic light cost, and Z is the cost related to transfer of road types. The time cost C(Rn) of the vehicular route can be calculated by $$C(Rn)=\Sigma\{C(Ln)+C(Nn)\}/Vn \quad (5)$$

wherein Vn is the designated vehicle velocity according to the road type of link n.

Further, the cost C(Sn) of a parking lot node and a station node in a public transportation route can be expressed by $$C(Sn)=\Sigma(Xpn+Ypn+Zpn+Stn+Bfn) \quad (6)$$

wherein Xpn is the parking fee converted into a time cost (by, for example, converting 500 yen into 30 minutes), Ypn is the public transportation service fee converted into a time cost, Zpn is the waiting time, Stn is the cost related to number of stairs and uneven paths converted into units of time, and Bfn is the cost related to the degree to which the facility is barrier-free for a user using a wheelchair, in units of time (this cost, for example, increases the regular cost of a staircase by 10 times when no slope or elevator is provided in place of the staircase). The link cost C(Sl) of the public transportation route is $$C(Sl)=\Sigma(Lmn+Tmn) \quad (7)$$

wherein Lmn is the required travel time between stations, and Tmn is the required walk time for pedestrian links. As a result, the total cost C for a composite route using both a vehicle and public transportation can be calculated by $$C=\Sigma\{C(Ln)+C(Nn)\}/Vn+\Sigma(Lmn+Tmn+Xpn+Ypn+Zpn+Stn+Bfn) \quad (8)$$

When searching for a route including public transportation, the cost is calculated in units of time as described above. It then becomes apparent whether the route using vehicle only or the public transportation route is more appropriate, allowing the user to easily recognize which route should be selected.

In the present embodiment, the parking fees, public transportation service fees, and the degree of easiness of travel are converted into units of time for inclusion into the cost calculation. It may be preferable to allow the user to appropriately designate the conversion coefficient used for such conversion into time units, because some users do not mind when the parking fees and the public transportation service fees are somewhat expensive, and others may wish to strongly evaluate the degree of easiness of travel.

What is claimed is:

1. A route guiding apparatus for searching and indicating a route for reaching a destination, comprising:

a calculation means for calculating a cost associated with a route using a public transportation service and a cost associated with a route using a vehicle only; and a control means for indicating said route using the public transportation service when the cost of said route using the public transportation service is smaller than the cost of said route using the vehicle only by at least a predetermined value;

wherein said cost includes at least one of a time and a financial expense.

2. The route guiding apparatus defined in claim 1, wherein
said calculation means calculates, for said route using vehicle only, an estimated arrival time via a static route and an estimated arrival time via a dynamic route; and
said control means indicates said route using public transportation service when the estimated arrival time via said dynamic route is later than the estimated arrival time via said static route by at least a predetermined interval of time.

3. The route guiding apparatus defined in claim 1, further comprising:
a memory means for storing in advance a zone in which public transportation service can be used; wherein
said control means indicates said route using public transportation service when a current location is located within said zone in which public transportation service can be used.

4. The route guiding apparatus defined in claim 1, further comprising:
a memory means for storing in advance a zone in which public transportation service can be used; wherein
said control means indicates said route using public transportation service when said destination is located within said zone in which public transportation service can be used.

5. The route guiding apparatus defined in claim 1, further comprising:
an acquiring means for acquiring information concerning vacancy in a parking lot near said destination; wherein
said control means indicates said route using public transportation service when there is no vacancy in said parking lot near said destination.

6. The route guiding apparatus defined in claim 1, further comprising:
an acquiring means for acquiring traffic advisory information concerning said route using vehicle only; wherein
said control means indicates said route using public transportation service when there exists a traffic advisory related to said route using vehicle only.

7. The route guiding apparatus defined in claim 1, wherein
said control means indicates said route using public transportation service when there exists a plurality of public transportation services that can be used.

8. The route guiding apparatus defined in claim 1, further comprising:
an acquiring means for acquiring information concerning vacancy in a parking lot usable for making a transfer from vehicle to public transportation service; wherein
said control means indicates said route using public transportation service based on said information concerning vacancy in a parking lot usable for the transfer.

9. The route guiding apparatus defined in claim 8, further comprising:
a selection means for selecting between a route guiding mode based on said information concerning vacancy in a parking lot usable for the transfer, and a route guiding mode ignoring said vacancy information; wherein
in said route guiding mode ignoring said information concerning vacancy in a parking lot usable for the transfer, said route using public transportation service is indicated without depending on said information concerning vacancy in a parking lot usable for the transfer.

10. The route guiding apparatus defined in claim 1, wherein
said control means indicates a return route from said destination using public transportation service based on information concerning a closing time of a parking lot used when transferring from the vehicle to public transportation service.

11. The route guiding apparatus defined in claim 1, further comprising:
a portable terminal device storing route guiding information supplied from said control means.

12. The route guiding apparatus defined in claim 1, further comprising:
a memory means for storing data related to said route using public transportation service as link information and node information; wherein
said calculation means calculates the cost of said route using public transportation service based on said link information and said node information.

13. The route guiding apparatus defined in claim 12, wherein
said node information includes a node denoting a location of a parking lot near a boarding site of said public transportation service; and
said link information includes a link connecting a node denoting said boarding site and said node denoting said parking lot location.

14. The route guiding apparatus defined in claim 12, wherein
said public transportation service is a railway;
said node information includes nodes denoting locations of stations of said railway; and
said link information includes a link connecting between said nodes denoting the locations of said stations.

15. The route guiding apparatus defined in claim 12, wherein
said public transportation service is a railway;
said node information includes a node denoting a location of a station of said railway, and a node denoting a location of a parking lot near said station; and
said link information includes a link connecting between said nodes.

16. The route guiding apparatus defined in claim 15, wherein said node denoting said station location is a node denoting an exit of said station.

17. The route guiding apparatus defined in claim 12, wherein said public transportation service is a railway;
said node information includes a first node denoting a location of a platform of a station of said railway, a second node denoting a location of a parking lot near said station, and a third node denoting a location of an exit of said station; and
said link information includes a link connecting said second node and said third node, and a link connecting said first node and said third node.

18. The route guiding apparatus defined in claim 12, wherein
said public transportation service is a railway; and
when a plurality of railway lines exist, said node information and said link information are configured for each of said lines.

19. The route guiding apparatus defined in claim 12, wherein
said public transportation service is a railway;
said node information includes a node denoting a location of a station of said railway, and a node denoting a location on a road near said station; and
said link information includes a link connecting said nodes.

20. The route guiding apparatus defined in claim 19, wherein said node denoting said station location is a node denoting an exit of said station.

21. The route guiding apparatus defined in claim 11, wherein said memory means stores data related to a walking routes as said link information and said node information; and said calculation means calculates said route using public transportation service and a walking route based on said link information and said node information related to walking routes.

22. The route guiding apparatus defined in claim 1, further comprising:

a location detection means for detecting a current location;

a memory means for storing map data;

a traveling mode detection means for detecting a current traveling mode; and a correction means for correcting said detected current location by collating with said map data in accordance with said traveling mode.

23. The route guiding apparatus defined in claim 22, wherein said correction means performs said correction by using map data corresponding to said traveling mode, from among said map data.

24. The route guiding apparatus defined in claim 22, wherein said correction means performs said correction by using a different algorithm for each of a plurality of said traveling modes.

25. The route guiding apparatus defined in claim 24, wherein when said traveling mode is a railway, said algorithm employs a railway operation schedule.

26. The route guiding apparatus defined in claim 24, wherein when said traveling mode is walking, said algorithm does not perform said correction.

27. The route guiding apparatus defined in claim 11, wherein said portable terminal device is configured to be detachable from a vehicle; and said route guiding apparatus further comprises means for prohibiting detachment of said portable terminal device from said vehicle during vehicle traveling.

28. The route guiding apparatus defined in claim 11, wherein said portable terminal device is configured to be detachable from a vehicle; and said route guiding apparatus further comprises means for urging a driver to detach said portable terminal device from said vehicle when the driver dismounts said vehicle.

29. The route guiding apparatus defined in claim 1, wherein the units employed by said calculation means when calculating the cost of said route using public transportation service and the cost of said route using vehicle only are units of time.

30. The route guiding apparatus defined in claim 29, wherein said calculation means calculates the cost of said route using vehicle only based on a vehicle velocity designated according to a road type.

31. The route guiding apparatus defined in claim 29, wherein said calculation means calculates the cost of said route using public transportation service based on a degree of easiness of travel.

32. The route guiding apparatus defined in claim 29, wherein said calculation means calculates the cost of said route using public transportation service based on a waiting time.

33. A computer-readable medium on which is recorded a program for searching for a route leading to a destination, in which processing performed by a computer through execution of said program includes the following steps of:

(a) searching for a route using a vehicle only to reach said destination;

(b) calculating a cost of said route using the vehicle only;

(c) searching for a route using a public transportation service;

(d) calculating a cost of said route using the public transportation service; and (e) outputting said route using the public transportation service when the cost of said route using the public transportation service is smaller than the cost of said route using the vehicle only by at least a predetermined value;

wherein said cost includes at least one of a time and a financial expense.

34. The computer-readable medium defined in claim 33, wherein in said step (c), said search is performed by using link information and node information associated with said route using public transportation service.

35. The computer-readable medium defined in claim 33, further comprising the following steps of:

(f) detecting a current location;

(g) determining a current traveling mode: and (h) correcting said current location by collating with map data in accordance with said traveling mode.

36. The computer-readable medium defined in claim 33, wherein in said step (b) and said step (d), said costs are calculated in units of time.

37. The computer-readable medium defined in claim 33, wherein in said step (b), said cost is calculated in units of time based on a vehicle velocity designated according to a road type.

38. A route guiding method for searching and indicating a route for reaching a destination, comprising the steps of:

searching for a route using a vehicle only to reach said destination;

calculating a cost of said route using the vehicle only;

searching for a route using a public transportation service;

calculating a cost of said route using the public transportation service; and indicating said route using the public transportation service when the cost of said route using the public transportation service is smaller than the cost of said route using the vehicle only by at least a predetermined value;

wherein said cost includes at least one of a time and a financial expense.

* * * * *

UNITED STATES PATENT AND TRADEMARK OFFICE
CERTIFICATE OF CORRECTION

PATENT NO.    : 6,421,606 B1
DATED         : July 16, 2002
INVENTOR(S)   : Goro Asai et al.

It is certified that error appears in the above-identified patent and that said Letters Patent is hereby corrected as shown below:

<u>Column 25,</u>
Line 3, "claim 11" should read -- claim 12 --.

Signed and Sealed this

Twelfth Day of November, 2002

Attest:

Attesting Officer

JAMES E. ROGAN
*Director of the United States Patent and Trademark Office*